(12) United States Patent
Zhou et al.

(10) Patent No.: US 12,143,187 B2
(45) Date of Patent: Nov. 12, 2024

(54) MITIGATING NON-TRANSMITTED BEAM FAILURE DETECTION REFERENCE SIGNAL DUE TO LISTEN-BEFORE-TALK FAILURE

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/647,746

(22) Filed: Jan. 12, 2022

(65) Prior Publication Data

US 2022/0247475 A1    Aug. 4, 2022

Related U.S. Application Data

(60) Provisional application No. 63/144,316, filed on Feb. 1, 2021.

(51) Int. Cl.
*H04B 7/06* (2006.01)
*H04W 24/10* (2009.01)
*H04W 72/1263* (2023.01)
*H04W 74/0816* (2024.01)
*H04W 76/19* (2018.01)

(52) U.S. Cl.
CPC ....... *H04B 7/0695* (2013.01); *H04B 7/06968* (2023.05); *H04W 24/10* (2013.01);
(Continued)

(58) Field of Classification Search
CPC ............. H04W 36/085; H04W 72/046; H04W 72/20–21; H04W 74/0816;
(Continued)

(56) References Cited

U.S. PATENT DOCUMENTS 10,659,983 B2 *  5/2020  Wei ...................... H04B 7/0695
11,757,519 B2 *  9/2023  Zhang ................... H04W 76/19
                                                    370/329
(Continued)

FOREIGN PATENT DOCUMENTS

WO   WO-2019217880 A1   11/2019

OTHER PUBLICATIONS

International Search Report and Written Opinion—PCT/US2022/070174—ISA/EPO—May 11, 2022.

*Primary Examiner* — Brendan Y Higa
(74) *Attorney, Agent, or Firm* — QUALCOMM Incorporated

(57) ABSTRACT

Various aspects of the present disclosure generally relate to wireless communication. In some aspects, a user equipment (UE) may determine configuration information associated with a periodic beam failure detection reference signal (BFD-RS) for a wireless channel that has a listen-before-talk requirement. The UE may monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion. Numerous other aspects are described.

30 Claims, 12 Drawing Sheets

(52) U.S. Cl.
CPC ... *H04W 72/1263* (2013.01); *H04W 74/0816* (2013.01); *H04W 76/19* (2018.02)

(58) Field of Classification Search
CPC ..... H04W 74/0841–085; H04W 76/19; H04W 24/10; H04W 36/0055–0058; H04B 7/0617; H04B 7/0695; H04B 7/088; H04B 17/309–364; H04B 7/06–0697
See application file for complete search history.

(56) References Cited

U.S. PATENT DOCUMENTS

| | | | |
|---|---|---|---|
| 2017/0195889 A1* | 7/2017 | Takeda | H04W 72/0446 |
| 2018/0242276 A1 | 8/2018 | Patel et al. | |
| 2019/0173740 A1* | 6/2019 | Zhang | H04L 41/0677 |
| 2019/0229792 A1* | 7/2019 | John Wilson | H04W 72/046 |
| 2019/0253127 A1* | 8/2019 | Kang | H04B 7/0456 |
| 2019/0253308 A1* | 8/2019 | Huang | H04L 43/0823 |
| 2019/0254042 A1* | 8/2019 | Cirik | H04L 5/0048 |
| 2019/0320333 A1* | 10/2019 | Koskela | H04B 7/0617 |
| 2020/0351674 A1* | 11/2020 | Zhou | H04L 5/0048 |
| 2021/0014884 A1* | 1/2021 | Yang | H04L 41/0654 |
| 2021/0058998 A1* | 2/2021 | Yuan | H04W 72/21 |
| 2021/0234601 A1* | 7/2021 | Awadin | H04L 5/0048 |
| 2021/0314218 A1* | 10/2021 | Kang | H04B 7/088 |
| 2022/0085862 A1* | 3/2022 | Kung | H04W 74/0841 |
| 2023/0164865 A1* | 5/2023 | Kang | H04B 7/0695 370/329 |

\* cited by examiner

MITIGATING NON-TRANSMITTED BEAM FAILURE DETECTION REFERENCE SIGNAL DUE TO LISTEN-BEFORE-TALK FAILURE

CROSS-REFERENCE TO RELATED APPLICATION

This Patent application claims priority to U.S. Provisional Patent Application No. 63/144,316, filed on Feb. 1, 2021, entitled "MITIGATING NON-TRANSMITTED BEAM FAILURE DETECTION REFERENCE SIGNAL DUE TO LISTEN-BEFORE-TALK FAILURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mitigating a non-transmitted beam failure detection reference signal (BFD-RS) due to listen-before-talk (LBT) failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: determine configuration information associated with a periodic beam failure detection reference signal (BFD-RS) for a wireless channel that has a listen-before-talk (LBT) requirement; and monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, a base station for wireless communication includes a memory and one or more processors, coupled to the memory, configured to: determine configuration information associated with a periodic BFD-RS for a wireless channel that has an LBT requirement; and transmit, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, a method of wireless communication performed by a UE includes determining configuration information associated with a periodic BFD-RS for a wireless channel that has an LBT requirement; and monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, a method of wireless communication performed by a base station includes determining configuration information associated with a periodic BFD-RS for a wireless channel that has an LBT requirement; and transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, an apparatus for wireless communication includes means for determining configuration information associated with a periodic BFD-RS for a wireless channel that has an LBT requirement; and means for monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, an apparatus for wireless communication includes means for determining configuration information associated with a periodic BFD-RS for a wireless channel that has an LBT requirement; and means for transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, a non-transitory computer-readable medium storing a set of instructions for wireless communication includes one or more instructions that, when executed by one or more processors of a UE, cause the UE to: determine configuration information associated with a periodic BFD-RS for a wireless channel that has an LBT requirement; and monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

In some aspects, a non-transitory computer-readable medium storing a set of instructions for wireless communication includes one or more instructions that, when executed by one or more processors of a base station, cause the base station to: determine configuration information associated with a periodic BFD-RS for a wireless channel that has an LBT requirement; and transmit, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
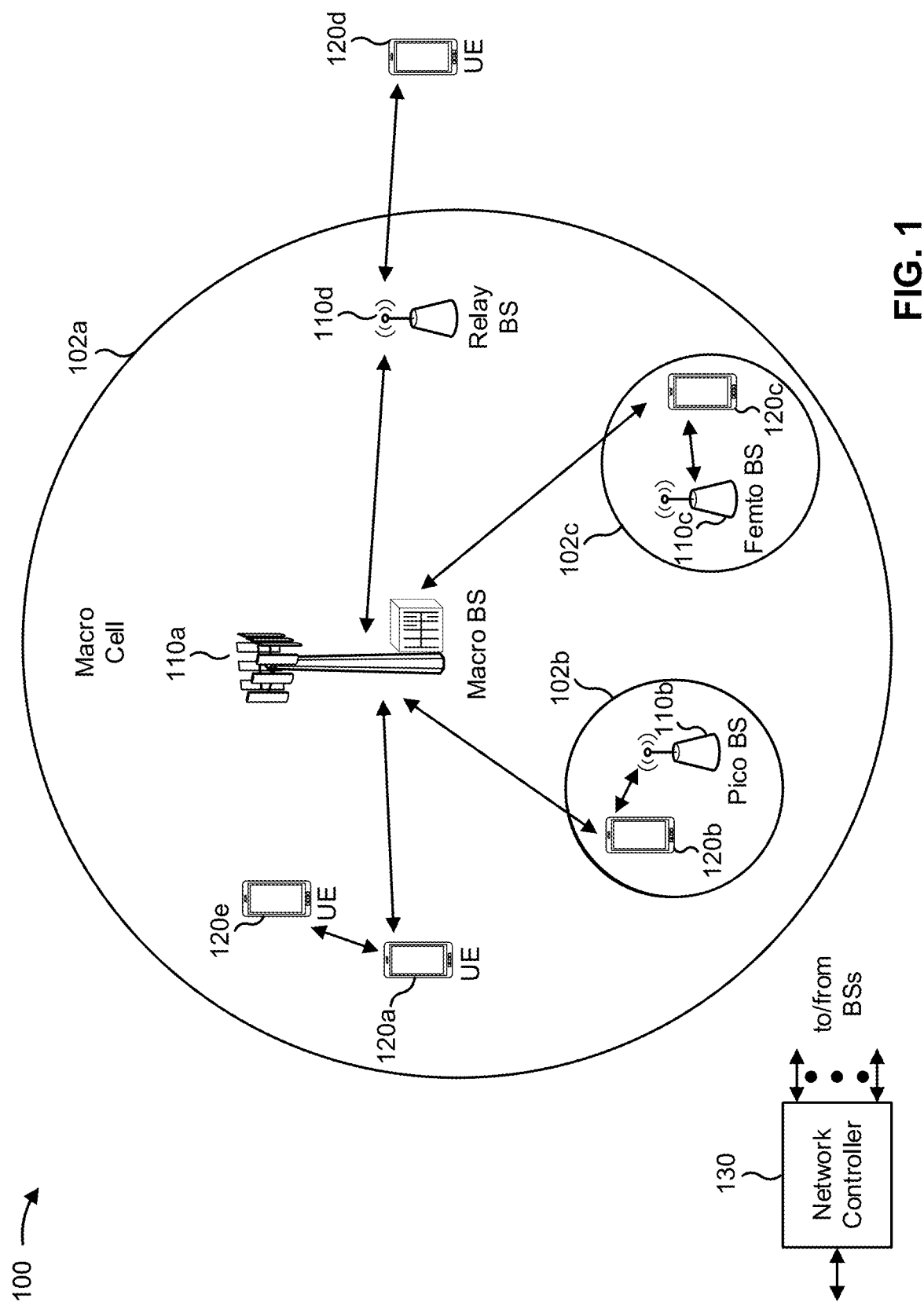
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, and/or channels. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4, sometimes referred to as FRx), which may span from 52.6 GHz to 114.25 GHz, and/or may communicate using an operating band having a fifth frequency range (FR5), which may include frequencies higher than 114.25 GHz (e.g., sub-terahertz), among other examples. Note that FR3 is between FR1 and FR2, and FR4 and FR5 are above FR2. The frequencies between FR1 and FR2 (e.g., in FR3) are sometimes referred to as mid-band frequencies or a "sub-centimeter wave" band. Although a portion of FR1 is greater than 6 GHz, FR1 is often referred to as a "sub-6 GHz" band. Similarly, FR2 and FR4 are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, FR4, and/or FR5, and/or mid-band frequencies (e.g., less than 24.25 GHz). Furthermore, it is contemplated that the frequencies included in FR1, FR2, FR3, FR4, FR5, and/or other frequency ranges may be modified, and techniques described herein are applicable to those modified frequency ranges.

In some aspects, devices of wireless network 100 may communicate with one another using a licensed radio frequency spectrum band and/or an unlicensed radio frequency spectrum band. For example, a base station 110 and a UE 120 may communicate using a RAT such as Licensed-Assisted Access (LAA), Enhanced LAA (eLAA), Further Enhanced LAA (feLAA), and/or NR-Unlicensed (NR-U), among other examples. In some aspects, wireless local area network (WLAN) devices (e.g., WLAN access points and WLAN stations) may communicate with one another using only the unlicensed radio frequency spectrum band (and not the licensed radio frequency spectrum band). The unlicensed radio frequency spectrum band may therefore be shared by the base stations 110, the UEs 120, the WLAN devices, and/or other devices. Because the unlicensed radio frequency spectrum band may be shared by devices operating under different protocols (e.g., different RATs), transmitting devices may need to contend for access to the unlicensed radio frequency spectrum band prior to transmitting over the unlicensed radio frequency spectrum band.

For example, in a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as another UE, an IoT device, and/or a WLAN device, among other examples). The channel access procedure may include sensing or measuring the physical channel (e.g., performing a reference signal received power (RSRP) measurement, detecting an energy level, or performing another type of measurement) during a channel access gap (which may also be referred to as a contention window) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a channel occupancy time (COT).

As indicated above, FIG. 1 is provided as an example. Other examples may differ from what is described with regard to FIG. 1.

Figure 2:
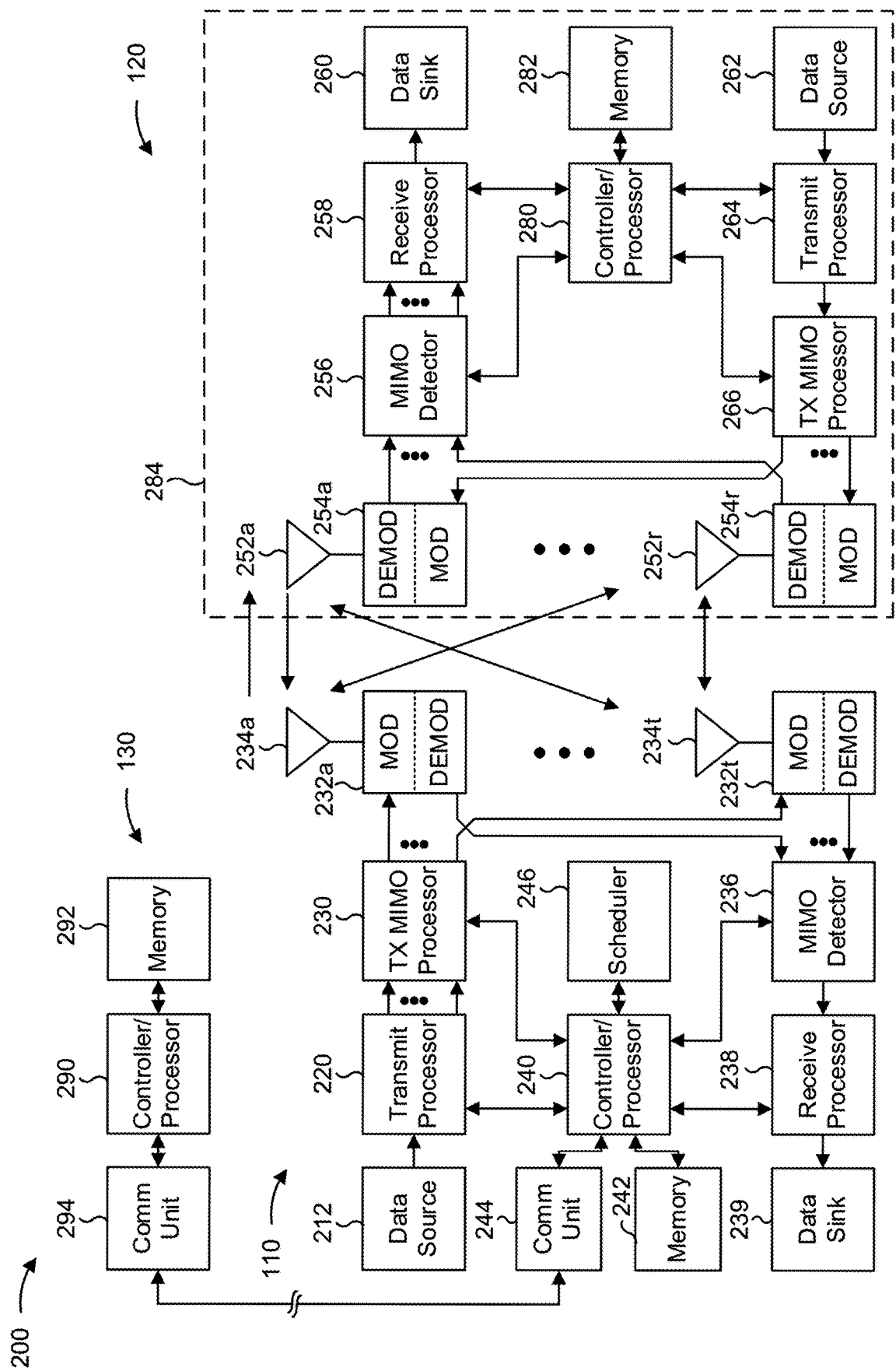
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A-6C, FIG. 7, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A-6B, FIG. 7, and/or FIG. 8).

Controller/processor 240 of base station 110, controller/processor 280 of UE 120, and/or any other component(s) of FIG. 2 may perform one or more techniques associated with mitigating a non-transmitted beam failure detection reference signal (BFD-RS) due to listen-before-talk (LBT) failure, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for determining configuration information associated with a periodic BFD-RS for a wireless channel that has an LBT requirement; and/or means for monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for estimating, within each periodic cluster, a beam quality based at least in part on a measurement associated with the periodic BFD-RS in one of the multiple transmission opportunities that provides a best estimated quality.

In some aspects, the UE 120 includes means for estimating, within each periodic cluster, a beam quality based at least in part on a joint measurement associated with the periodic BFD-RS across all of the multiple transmission opportunities in the periodic cluster.

In some aspects, the UE 120 includes means for receiving, from the base station 110, signaling to configure one or more measurements to estimate a beam quality associated with the periodic BFD-RS within each periodic cluster.

In some aspects, the UE 120 includes means for receiving, from the base station 110, signaling indicating individual resource identifiers that each correspond to one transmission opportunity and further indicating a periodicity that is common to the multiple transmission opportunities.

In some aspects, the UE 120 includes means for receiving, from the base station 110, signaling indicating a resource set associated with periodic reference signal resources for the multiple transmission opportunities.

In some aspects, the UE 120 includes means for receiving, from the base station 110, signaling indicating a periodic resource identifier and a periodic pattern that is common to the multiple transmission opportunities.

In some aspects, the UE 120 includes means for determining a priority associated with the periodic BFD-RS based at least in part on a number of the multiple transmission opportunities within each periodic cluster.

In some aspects, the UE 120 includes means for receiving, from the base station 110, signaling indicating the association between the periodic BFD-RS and the aperiodic BFD-RS.

In some aspects, the UE 120 includes means for determining the association between the periodic BFD-RS and the aperiodic BFD-RS based at least in part on a quasi co-location (QCL) source reference signal associated with the periodic BFD-RS and a QCL source reference signal associated with the aperiodic BFD-RS.

In some aspects, the UE 120 includes means for determining the association between the periodic BFD-RS and the aperiodic BFD-RS based at least in part on a resource identifier associated with the periodic BFD-RS and a resource identifier associated with the aperiodic BFD-RS.

In some aspects, the UE 120 includes means for monitoring the wireless channel for the aperiodic BFD-RS linked to the periodic BFD-RS during a time window for the aperiodic BFD-RS based at least in part on a failure to detect the periodic BFD-RS in the scheduled occasion.

In some aspects, the UE 120 includes means for detecting a transmission of the aperiodic BFD-RS during the time window associated with the scheduled occasion of the periodic BFD-RS; and/or means for estimating a beam quality based at least in part on a measurement associated with the transmission of the aperiodic BFD-RS detected during the time window.

In some aspects, the UE 120 includes means for detecting a transmission of the aperiodic BFD-RS during the time window associated with the scheduled occasion of the periodic BFD-RS; and/or means for estimating a beam quality based at least in part on a first measurement associated with the transmission of the aperiodic BFD-RS detected during the time window and a second measurement associated with the scheduled occasion of the periodic BFD-RS.

In some aspects, the UE 120 includes means for determining that the aperiodic BFD-RS is not detected during the time window associated with the scheduled occasion of the periodic BFD-RS; and/or means for estimating a beam quality based at least in part on a measurement associated with the scheduled occasion of the periodic BFD-RS.

In some aspects, the UE 120 includes means for receiving, from the base station 110, signaling to indicate the non-transmission of the periodic BFD-RS in the scheduled occasion; and/or means for determining a beam quality measurement based at least in part on the non-transmission of the periodic BFD-RS in the scheduled occasion.

In some aspects, the UE 120 includes means for discarding a measurement result or use a default value as the measurement result for the periodic BFD-RS in the scheduled occasion in which the periodic BFD-RS was not transmitted.

In some aspects, the UE 120 includes means for ignoring a beam failure detection indicator caused by the non-transmission of the periodic BFD-RS in the scheduled occasion.

In some aspects, the UE 120 includes means for terminating a beam failure recovery procedure triggered by the non-transmission of the periodic BFD-RS in the scheduled occasion.

In some aspects, the base station 110 includes means for determining configuration information associated with a periodic BFD-RS for a wireless channel that has an LBT requirement; and/or means for transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for attempting an LBT procedure prior to each of the multiple transmission opportunities for the periodic BFD-RS; and/or means for transmitting, within each periodic cluster, the periodic BFD-RS in an earliest of the multiple transmission opportunities in which the LBT procedure succeeds.

In some aspects, the base station 110 includes means for attempting an LBT procedure prior to each of the multiple transmission opportunities for the periodic BFD-RS; and/or means for refraining from transmitting the periodic BFD-RS within a periodic cluster based at least in part on the LBT procedure failing prior to each of the multiple transmission opportunities.

In some aspects, the base station 110 includes means for attempting an LBT procedure prior to each of the multiple transmission opportunities for the periodic BFD-RS; and/or means for transmitting, within a periodic cluster, the periodic BFD-RS in a last of the multiple transmission opportunities based at least in part on the LBT procedure failing prior to each of the multiple transmission opportunities that occur prior to the last transmission opportunity.

In some aspects, the base station 110 includes means for transmitting, to the UE 120, signaling to configure one or more measurements to estimate a beam quality associated with the periodic BFD-RS within each periodic cluster.

In some aspects, the base station 110 includes means for transmitting, to the UE 120, signaling indicating individual resource identifiers that each correspond to one transmission opportunity and further indicating a periodicity that is common to the multiple transmission opportunities.

In some aspects, the base station 110 includes means for transmitting, to the UE 120, signaling indicating a resource set associated with periodic reference signal resources for the multiple transmission opportunities.

In some aspects, the base station 110 includes means for transmitting, to the UE 120, signaling indicating a periodic resource identifier and a periodic pattern that is common to the multiple transmission opportunities.

In some aspects, the base station 110 includes means for transmitting, to the UE 120, signaling indicating the association between the periodic BFD-RS and the aperiodic BFD-RS.

In some aspects, the base station 110 includes means for transmitting the aperiodic BFD-RS linked to the periodic BFD-RS via the wireless channel during a time window for the aperiodic BFD-RS based at least in part on the non-transmission of the periodic BFD-RS in the scheduled occasion.

In some aspects, the base station 110 includes means for transmitting, to the UE 120, signaling to indicate the non-transmission of the periodic BFD-RS in the scheduled occasion, wherein a beam quality measurement determined by the UE is based at least in part on the non-transmission of the periodic BFD-RS in the scheduled occasion.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
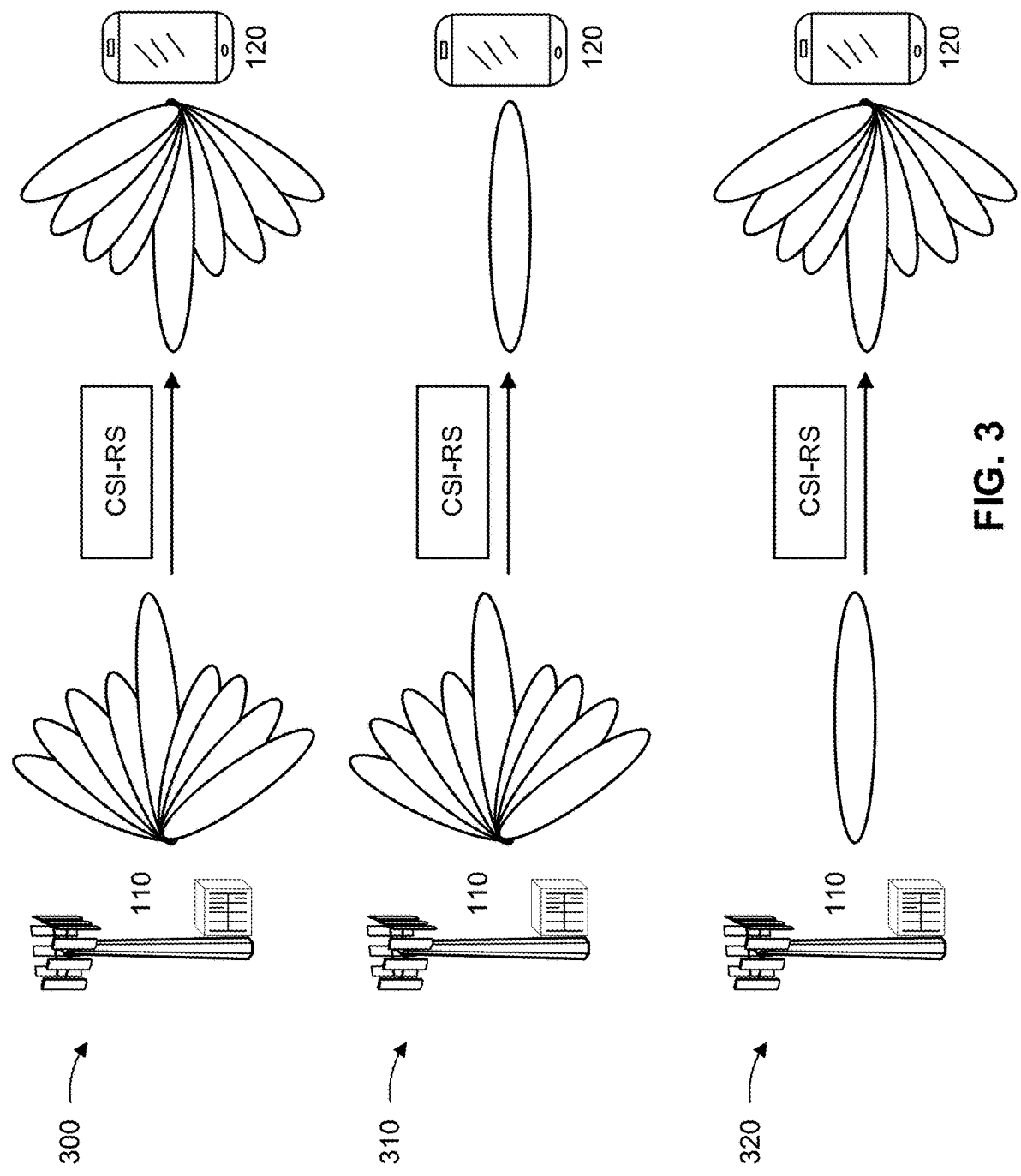
FIG. 3 is a diagram illustrating examples of beam management procedures, in accordance with the present disclosure.

FIG. 3 is a diagram illustrating examples 300, 310, and 320 of beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using channel state information reference signals (CSI-RSs). Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI) signaling).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
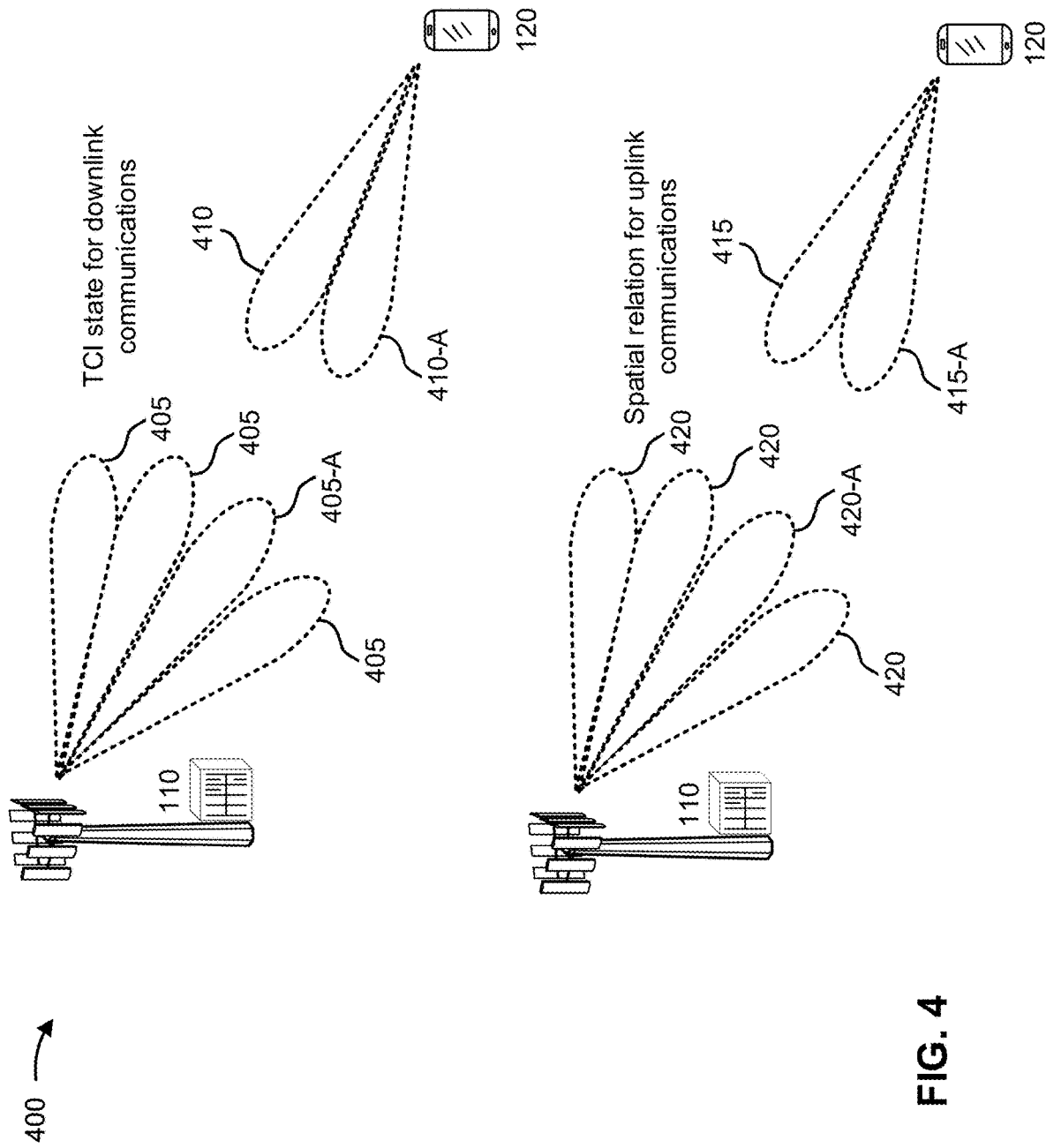
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another in a wireless network (e.g., wireless network 100).

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (e.g., that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (e.g., a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a transmission configuration indication (TCI) state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (e.g., for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (e.g., an SSB and an aperiodic, periodic, or semi-persistent CSI-RS) for different QCL types (e.g., QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (e.g., activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (e.g., that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (e.g., a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
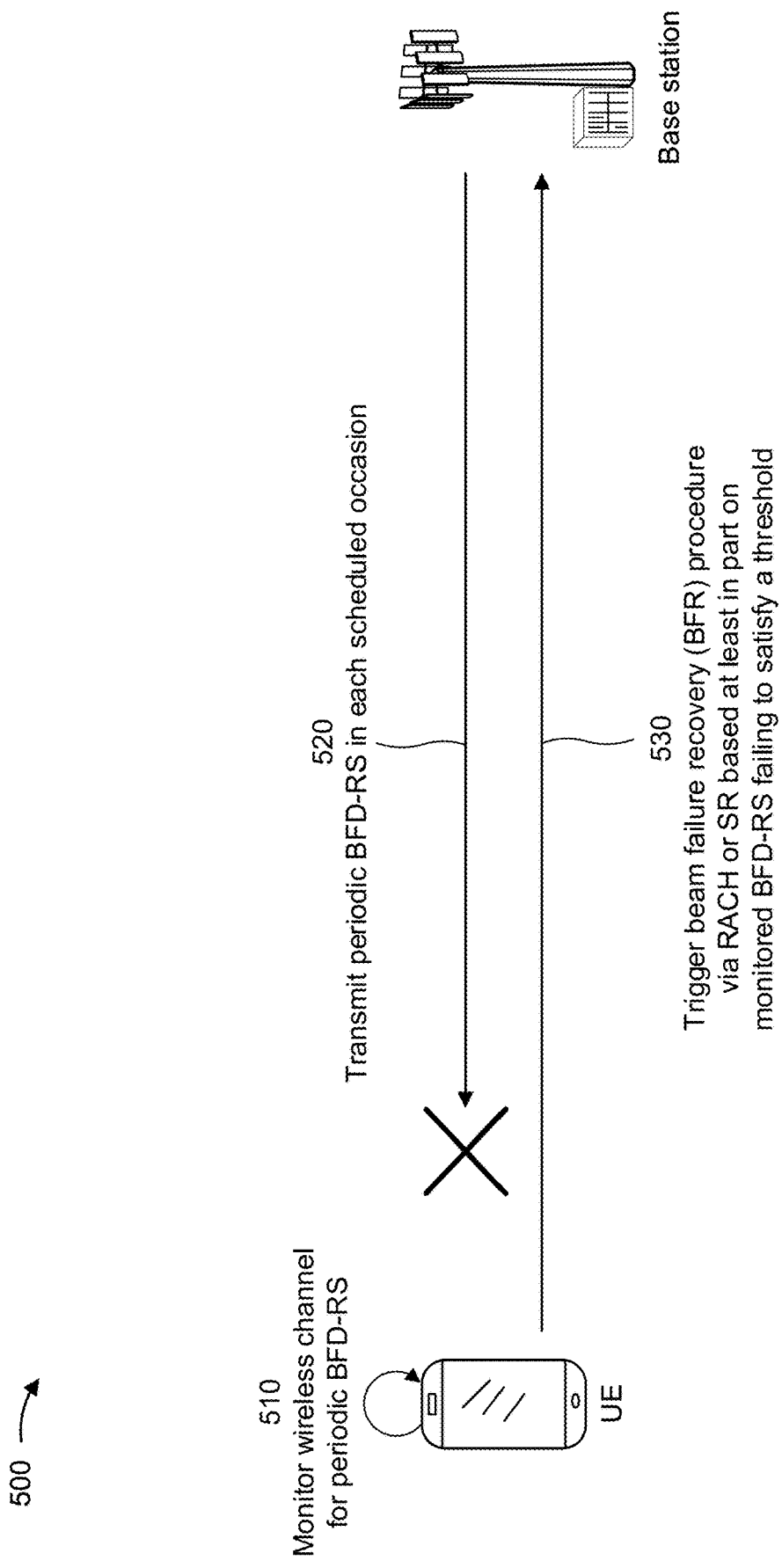
FIG. 5 is a diagram illustrating an example of triggering a beam failure recovery procedure, in accordance with the present disclosure.

FIG. 5 is a diagram illustrating an example 500 of triggering a beam failure recovery (BFR) procedure, in accordance with the present disclosure. As shown in FIG. 5, a base station and a UE may communicate with one another in a wireless network (e.g., wireless network 100).

As shown in FIG. 5, and by reference number 510, the UE may monitor a wireless channel for a periodic beam failure detection reference signal (BFD-RS). For example, in some aspects, the UE and the base station may communicate over a wireless channel associated with one or more component carriers in one or more frequency ranges. As described in further detail above with reference to FIGS. 3-4, the UE and the base station may communicate to perform one or more beam management procedures to select, configure, maintain, or otherwise manage beams that are used for downlink and uplink communication. Accordingly, in some aspects, the base station may configure the UE to monitor one or more reference signals (e.g., SSBs and/or CSI-RSs) configured as a periodic BFD-RS. In this way, the UE may monitor the wireless channel for transmissions of the periodic BFD-RS in one or more scheduled occasions, and may use a measurement (e.g., an RSRP measurement) associated with the periodic BFD-RS to determine whether a beam failure has occurred (e.g., a beam used to transmit the BFD-RS is no longer suitable for downlink and/or uplink communication due to one or more obstructions or other conditions causing degraded performance in the wireless channel).

As further shown in FIG. 5, and by reference number 520, the base station may transmit the periodic BFD-RS in each scheduled occasion using a beam associated with a BPL that is used for communication between the UE and the base station. For example, the periodic BFD-RS can be an SSB or a periodic CSI-RS configured for beam management and may be associated with a transmit beam that is used to transmit a control channel (e.g., a PDCCH). Accordingly, the base station may periodically transmit the periodic BFD-RS in each scheduled occasion, and the UE may monitor the wireless channel for the periodic BFD-RS to determine when beam failure has occurred. For example, in some aspects, there may be one or more obstructions in the wireless channel between the base station and the UE, interference in the wireless channel between the base station and the UE, and/or other conditions that may be degrading performance of the communication via the beam corresponding to the periodic BFD-RS. Accordingly, the UE may determine one or more metrics associated with the periodic BFD-RS to estimate a beam quality associated with the corresponding beam, and the UE may trigger a BFR procedure to select or otherwise configure a new beam when the metric(s) associated with the periodic BFD-RS satisfy a condition.

For example, as further shown in FIG. 5, and by reference number 530, the UE may trigger a BFR procedure based at least in part on the measurement associated with the periodic BFD-RS failing to satisfy a threshold. Additionally, or alternatively, in cases where the UE is configured with multiple periodic BFD-RSs, the UE may trigger the BFR procedure in response to determining that measurements associated with all periodic BFD-RSs monitored by the UE fail to satisfy the threshold (e.g., an RSRP measurement is below a threshold and/or a block error rate (BLER) of a hypothetical PDCCH transmission exceeds a threshold, among other examples). Additionally, or alternatively, the UE may trigger the BFR procedure based on a number of beam failure instances from a physical (PHY) layer to a MAC layer satisfying (e.g., reaching) a threshold before a configured timer expires. For example, as shown, the UE may generally trigger the BFR procedure by initiating a random access channel (RACH) procedure (e.g., by transmitting a physical RACH (PRACH) preamble in msg1 of a four-step RACH procedure or msgA in a two-step RACH procedure) and/or transmitting a scheduling request (SR).

To find candidate new beams, the UE may then monitor a beam identification reference signal (e.g., an SSB or a periodic CSI-RS configured for beam management), which the base station may transmit with a wider beam than the beam(s) used for data. When the UE has triggered the BFR procedure and found a new beam, the UE may transmit a beam recovery request message to the base station, which may respond to the beam recovery request message with a beam recovery response message transmitted over a control channel (e.g., a PDCCH) to the UE. Accordingly, the UE may monitor the control channel for the beam recovery response message, and the BFR procedure may be complete and a new BPL may be established when the UE successfully receives the beam recovery response message. Alternatively, in cases where the UE fails to detect any beam recovery response message within a configured time period, the UE may retransmit the beam recovery request message. In cases where the UE still fails to detect any beam recovery response message after a threshold number of retransmissions, the UE may notify higher layers, potentially leading to radio link failure (RLF) and/or cell reselection.

Accordingly, as described above, the periodic BFD-RS may be transmitted by the base station and monitored by the UE to determine whether conditions in the wireless channel are causing degraded performance for one or more beams that are used for communication between the base station and the UE. In general, the degraded performance may be detected based on one or more measurements that relate to beam quality, such as an RSRP measurement and/or an estimated BLER for a hypothetical PDCCH transmission, among other examples. However, in some cases, the wireless channel used for communication between the base station and the UE may be included in unlicensed spectrum or other shared spectrum (e.g., the 6 GHz unlicensed band and/or a frequency band in a frequency range from 52.6 GHz to 71 GHz or higher). Accordingly, because different network operators and/or different RATs may be operating in unlicensed or other shared spectrum, one challenge that arises is the need to perform a channel access procedure to ensure fair coexistence with other devices (e.g., WLAN devices) that may be operating in the unlicensed spectrum.

For example, prior to gaining access to and/or transmitting over a wireless channel associated with unlicensed or shared spectrum, a transmitting device (e.g., a base station and/or a UE) may be required to perform a listen-before-talk (LBT) procedure to contend for access to the wireless channel. The LBT procedure may include a clear channel assessment (CCA) procedure to determine whether the wireless channel subject to the LBT requirement is available (e.g., unoccupied by other transmitters). In particular, a device performing a CCA procedure may detect an energy level on a wireless channel in unlicensed or shared spectrum and determine whether the energy level satisfies (e.g., is less than or equal to) a threshold, sometimes referred to as an energy detection threshold. When the energy level satisfies (e.g., is below) the threshold, the LBT procedure is deemed to be successful and the transmitting device may gain access to the wireless channel for a duration referred to as a channel occupancy time. During the channel occupancy time, the transmitting device can perform one or more transmissions without having to perform any additional LBT operations. However, when the energy level fails to satisfy (e.g., equals or exceeds) the energy detection threshold, the LBT procedure fails and contention to access the unlicensed channel by the transmitting device is unsuccessful. In such cases, the transmitting device is not permitted to transmit over the wireless channel.

Accordingly, in some cases, the base station may be unable to transmit a periodic BFD-RS due to LBT failure. In other words, in cases where the base station attempts the LBT procedure in a contention window prior to an occasion in which the periodic BFD-RS is to be transmitted, the base station may refrain from transmitting the BFD-RS in the corresponding occasion if the LBT procedure fails (e.g., because the energy sensed on the wireless channel during the contention window exceeds the applicable energy detection threshold). In such cases, from the UE perspective, the occasion in which the BFD-RS is not transmitted may be treated as having a performance metric (e.g., an RSRP measurement or hypothetical BLER) that fails to satisfy a threshold, which may result in the UE declaring beam failure at the PHY layer and/or triggering a BFR procedure due to the non-transmission of the BFD-RS. However, the non-transmission of the BFD-RS in the corresponding occasion may be attributable to failure of the LBT procedure attempted by the base station rather than any obstructions and/or poor conditions in the wireless channel. As a result, the non-transmission of the BFD-RS by the base station due to LBT failure may lead to the UE falsely declaring beam failure and/or triggering a BFR procedure, which can lead to unnecessary overhead and interruption to ongoing traffic.

Some aspects described herein relate to techniques and apparatuses to mitigate a non-transmitted BFD-RS due to LBT failure. For example, in some aspects, a periodic BFD-RS may be exempted from the LBT requirement (e.g., conditionally or unconditionally), or a periodic BFD-RS may be configured with periodic clusters with multiple transmission opportunities per cluster to increase a probability that the base station will be able to successfully perform the LBT procedure and transmit the BFD-RS in at least one transmission opportunity per cluster. Additionally, or alternatively, a linkage or association may be defined between a periodic BFD-RS and an aperiodic BFD-RS, whereby the UE may monitor a wireless channel for a transmission of the aperiodic BFD-RS linked or associated with the periodic BFD-RS during a time window associated with a scheduled occasion in which the periodic BFD-RS is not transmitted due to LBT failure. Furthermore, in some aspects, the base station may transmit signaling to the UE to indicate one or more occasions in which the periodic BFD-RS is not transmitted due to LBT failure, and the UE may adjust or otherwise determine a beam quality measurement result for the one or more occasions accordingly to avoid unnecessarily declaring beam failure or triggering BFR due to LBT failure. For example, as described herein, the UE may ignore or discard measurements associated with the occasion(s) in which the periodic BFD-RS is not transmitted due to LBT failure, use a default value as the measurement(s) associated with the occasion(s) in which the periodic BFD-RS is not transmitted due to LBT failure, inform a MAC layer to ignore any BFD indicator caused by the non-transmitted BFD-RS, and/or inform the MAC layer to terminate any BFR procedure triggered by the non-transmitted BFD-RS.

As indicated above, FIG. 5 is provided as an example. Other examples may differ from what is described with regard to FIG. 5.

Figure 6A:
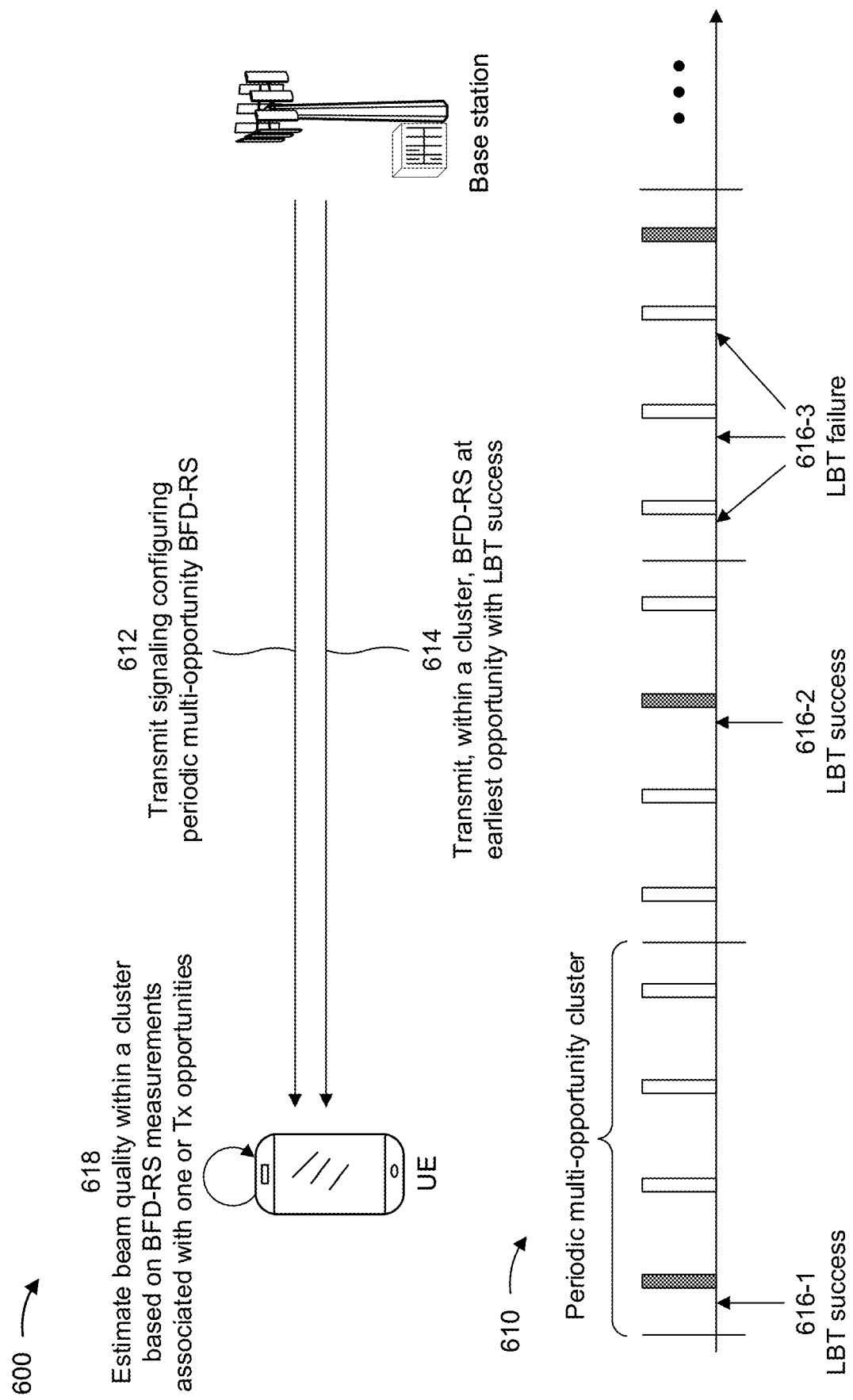
FIGS. 6A-6C are diagrams illustrating examples associated with mitigating a non-transmitted beam failure detection reference signal (BFD-RS) due to listen-before-talk (LBT) failure, in accordance with the present disclosure.
Figure 6B:
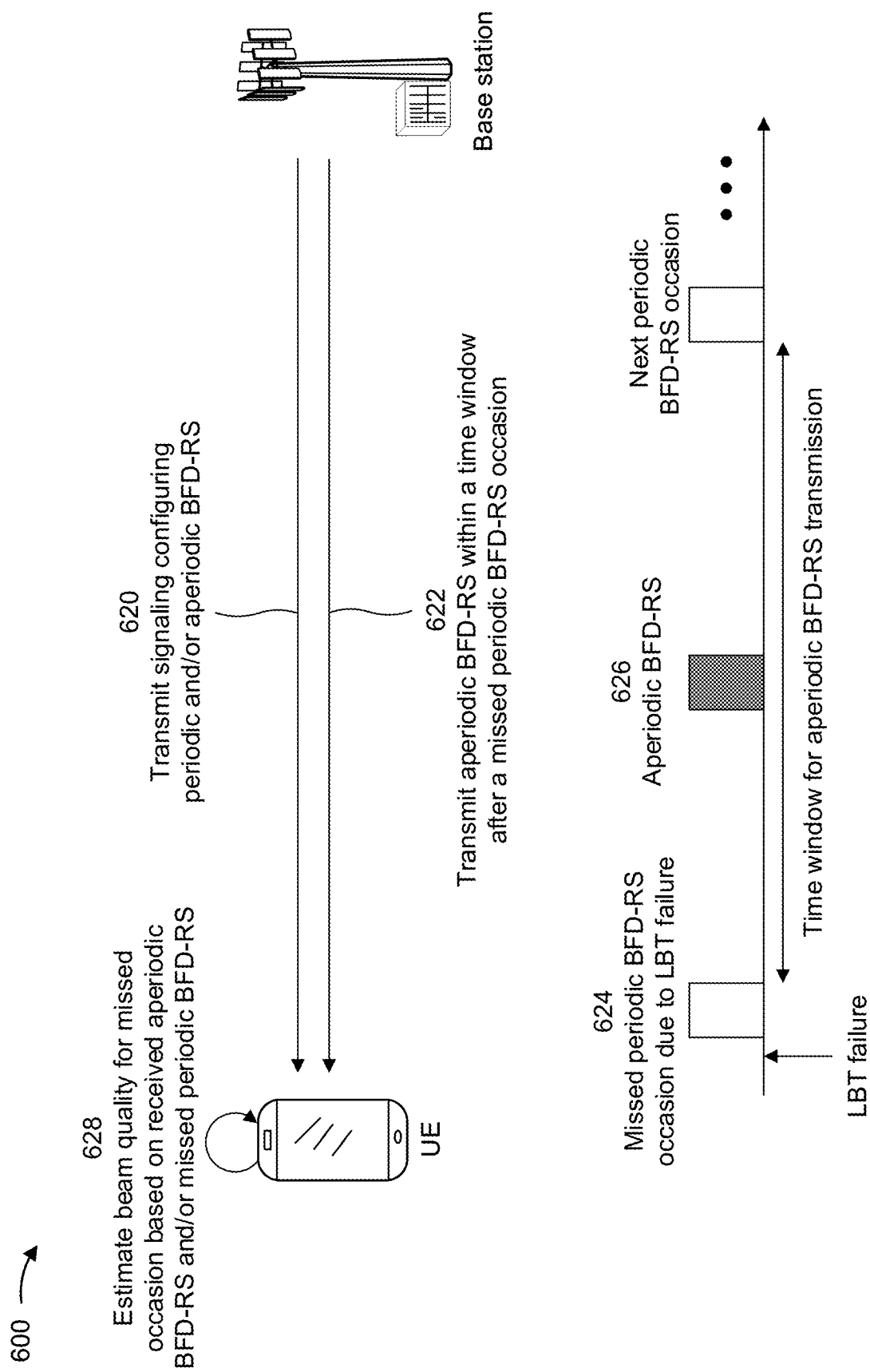
Figure 6C:
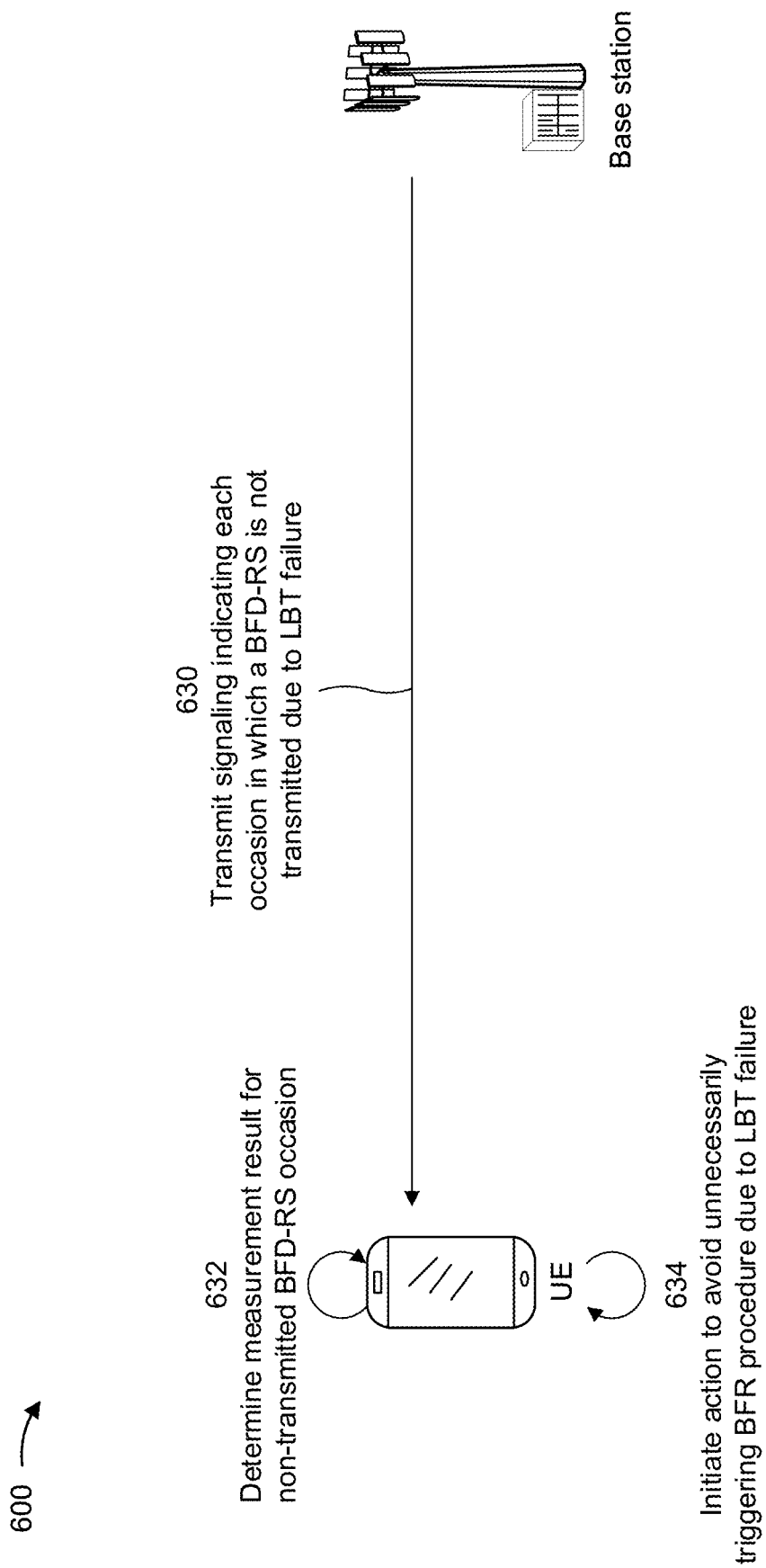

FIGS. 6A-6C are diagrams illustrating examples 600 associated with mitigating a non-transmitted BFD-RS due to LBT failure, in accordance with the present disclosure. As shown in FIGS. 6A-6C, examples 600 include communication between a base station (e.g., base station 110) and a UE (e.g., UE 120) in a wireless network (e.g., wireless network 100). As described herein, the base station and the UE may communicate via a wireless access link, which may include an uplink and a downlink. Furthermore, as described herein, the base station and the UE may communicate via a wireless channel that has an LBT requirement (e.g., a wireless channel in an unlicensed frequency band or other spectrum that is shared with other operators and/or RATs).

As shown in FIG. 6A and described in further detail herein, the base station may configure a periodic BFD-RS with one or more parameters to mitigate non-transmission of the periodic BFD-RS in one or more scheduled occasions. For example, in some aspects, the periodic BFD-RS may be associated with a configuration including one or more parameters indicating that the periodic BFD-RS is exempt from the LBT requirement. In some aspects, when the periodic BFD-RS is exempt from the LBT requirement, the exemption may be unconditional (e.g., the base station can always transmit the BFD-RS without having to perform a successful LBT procedure prior to the transmission). However, in some cases, unconditionally exempting the BFD-RS from the LBT requirement may cause interference with other transmitters (e.g., the other transmitters that caused the LBT procedure to fail). Accordingly, in some aspects, the periodic BFD-RS may be exempt from the LBT requirement only under certain conditions. For example, the periodic BFD-RS may be exempt from the LBT requirement only in cases where an overhead associated with the periodic BFD-RS fails to satisfy (e.g., is less than or equal to) a threshold (e.g., an amount of time resources occupied by the periodic BFD-RS relative to a channel occupancy time and/or an interval between contention windows is relatively small such that transmission of the periodic BFD-RS will cause minimal interference with other transmitters). Accordingly, in some aspects, the BFD-RS may be conditionally or unconditionally exempt from the LBT requirement to avoid or mitigate the circumstances in which the UE unnecessarily triggers a BFR procedure due to non-transmission of the BFD-RS.

Alternatively, as shown in FIG. 6A, and by reference number 610, the periodic BFD-RS may be configured as a periodic multi-opportunity BFD-RS, with periodic clusters that include multiple transmission opportunities per cluster. In such cases, as shown by reference number 612, the base station may transmit, and the UE may receive, signaling to configure the periodic multi-opportunity BFD-RS. In some aspects, the base station may explicitly signal configuration information associated with the periodic multi-opportunity BFD-RS. For example, the base station may transmit, to the UE, explicit signaling to configure the periodic multi-opportunity BFD-RS as a set of periodic reference signal resources that includes individual resource identifiers and a common periodicity. For example, in some aspects, each individual resource identifier in the set of periodic reference signal resources may correspond to one transmission opportunity in each periodic multi-opportunity cluster (e.g., in a cluster with four BFD-RS transmission opportunities, the set of periodic reference signal resources may include four individual resource identifiers, one for each opportunity). Furthermore, the resource identifiers may be associated with a common periodicity, and the different resource identifiers included in the set of periodic reference signal resources may be in the same resource set or in different resource sets (e.g., associated with a CSI-ResourceConfig parameter).

Alternatively, rather than configuring the periodic multi-opportunity BFD-RS as a set of periodic reference signal resources that includes individual resource identifiers and a common periodicity, the periodic multi-opportunity BFD-RS may be explicitly configured as a set of periodic reference signal resources associated with a periodic reference signal resource set identifier. In this case, each resource identifier associated with the periodic reference signal resource set identifier may correspond to one opportunity in each multi-opportunity cluster, and the periodic multi-opportunity BFD-RS may be defined by the periodic reference signal resource set identifier. In another example, the periodic multi-opportunity BFD-RS may be explicitly configured using a particular periodic reference signal resource identifier with multiple opportunities per transmission. For example, each BFD-RS transmission opportunity may be associated with the same periodic reference signal resource identifier, and the base station may configure a periodic pattern that indicates multiple opportunities for the periodic reference signal resource identifier (e.g., via RRC, MAC-CE, and/or DCI signaling). In this case, an interval between adjacent opportunities (e.g., a number of symbols or slots between adjacent opportunities) may be the same for each opportunity.

Alternatively, in some aspects, the configuration information associated with the periodic multi-opportunity BFD-RS may be implicitly signaled to the UE. For example, in a similar manner as described above, the base station may signal a periodic pattern that indicates multiple opportunities for the periodic multi-opportunity BFD-RS, with an interval between adjacent opportunities being the same for each opportunity. However, when the periodic multi-opportunity BFD-RS is implicitly signaled to the UE, the base station may not indicate a periodic reference signal resource identifier that is shared by each transmission opportunity. Accordingly, in this case, the UE may implicitly determine the appropriate reference signal resource identifier. For example, in some aspects, the reference signal resource identifier may correspond to a QCL source reference signal in a TCI state associated with a CORESET (e.g., a QCL source reference signal associated with QCL-TypeA, QCL-TypeB, QCL-TypeC, or QCL-TypeD, which define different combinations of Doppler shift, Doppler spread, average delay, delay spread, and/or spatial receive parameters).

As further shown in FIG. 6A, and by reference number 614, the base station may transmit, within a periodic cluster, the periodic BFD-RS at the earliest opportunity with LBT success. For example, in some aspects, the base station may attempt the LBT procedure in a contention window just prior to each transmission opportunity within a periodic cluster, and may transmit the BFD-RS in the first transmission opportunity following a successful LBT procedure. For example, as shown by reference number 616-1, the base station may transmit the BFD-RS in the first opportunity of a cluster if the LBT procedure is successful prior to the first opportunity. In another example, as shown by reference number 616-2, the base station may transmit the BFD-RS in the third opportunity of a cluster if the LBT procedure fails prior to the first and second opportunities and then succeeds prior to the third opportunity. In such cases, when there are additional transmission opportunities in the periodic cluster, the base station may continue to attempt the LBT procedure and transmit the BFD-RS in subsequent opportunities if the LBT procedure is successful (e.g., for additional robustness and/or to reduce the probability of the UE triggering a BFR procedure). Alternatively, the base station may transmit the BFD-RS no more than once per cluster (e.g., to conserve base station resources used to perform the LBT procedure, to conserve UE resources associated with monitoring the wireless channel for additional repetitions of the BFD-RS, and/or to allow other transmitters an opportunity to access the wireless channel).

However, in some cases, each LBT procedure attempted by the base station may fail (e.g., when other transmitters are occupying the wireless channel). In such cases, when the LBT procedure fails prior to each transmission opportunity in a cluster, the base station may refrain from transmitting the BFD-RS within the corresponding cluster. Alternatively, in some aspects, the base station may transmit the BFD-RS in the last opportunity within the cluster. For example, as shown by reference number 616-3, LBT procedures attempted by the base station before the first three transmission opportunities in a cluster may fail. In this example, the base station may transmit the BFD-RS in the fourth and final opportunity in the cluster regardless of any LBT success or failure. In some aspects, when the base station transmits the BFD-RS in the last opportunity of a cluster if none of the earlier opportunities have a successful LBT attempt, the base station may refrain from performing the LBT procedure prior to the last opportunity (e.g., because the BFD-RS will be transmitted regardless of whether the LBT procedure succeeds or fails).

As further shown in FIG. 6A, and by reference number 618, the UE may estimate, within a cluster, a beam quality for a beam associated with the periodic multi-opportunity BFD-RS according to measurements in one or more of the transmission opportunities within the cluster. For example, as described above, the UE may monitor the wireless channel for the transmission of the periodic multi-opportunity BFD-RS, and may generally expect at least one transmission of the BFD-RS per cluster. Accordingly, within a periodic cluster, the UE may estimate the beam quality associated with the periodic multi-opportunity BFD-RS according to one of the transmission opportunities in the cluster that provides the best estimated beam quality (e.g., a lowest hypothetical BLER and/or a highest RSRP among all opportunities in the cluster). Alternatively, in some aspects, the UE may estimate the beam quality jointly across all transmission opportunities in the cluster (e.g., by combining the hypothetical BLER and/or RSRP across all opportunities according to a linear average or non-coherent energy sum). In some aspects, the particular technique that the UE uses to estimate the beam quality may be configured by the base station (e.g., the base station may indicate that the UE is to estimate the beam quality according to the one transmission opportunity that provides the best estimated beam quality or by determining a linear average or non-coherent energy sum across all transmission opportunities). Additionally, or alternatively, in some aspects, the UE may evaluate the beam quality within a cluster based on an implementation or configuration associated with the UE.

Furthermore, in cases where the base station configures the UE to monitor a number of BFD-RSs that exceed a monitoring capability of the UE, the UE may determine a priority associated with each BFD-RS based on a number of transmission opportunities associated with each BFD-RS. For example, in some aspects, the UE may generally assign a higher priority to a periodic multi-opportunity BFD-RS relative to a legacy periodic BFD-RS that includes only one opportunity per period. Furthermore, among different multi-opportunity BFD-RSs, the UE may prioritize BFD-RSs that have a larger number of opportunities. In this way, by maximizing the number of transmission opportunities per BFD-RS (e.g., prioritizing multi-opportunity BFD-RSs over single-opportunity BFD-RSs and prioritizing multi-opportunity BFD-RSs that have more opportunities over multi-opportunity BFD-RSs that have fewer opportunities), the UE may increase a probability that the base station will be able to perform a successful LBT procedure and transmit the BFD-RS in each scheduled occasion, thereby reducing a probability that the UE will unnecessarily trigger a BFR procedure due to LBT failure.

Additionally, or alternatively, as shown in FIG. 6B and described in further detail herein, the UE may monitor the wireless channel for an aperiodic BFD-RS linked to a non-transmitted periodic BFD-RS, which may be a single-opportunity BFD-RS or a multi-opportunity BFD-RS. For example, in cases where the base station is unable to transmit the periodic BFD-RS due to LBT failure, the base station may transmit an aperiodic BFD-RS that is linked to or otherwise associated with the periodic BFD-RS to mitigate the non-transmission of the periodic BFD-RS. In such cases, the UE may need to determine the aperiodic BFD-RS that is associated with the non-transmitted BFD-RS in order to use the associated aperiodic BFD-RS to evaluate beam quality for the missed occasion (e.g., the occasion in which the BFD-RS was not transmitted).

For example, as shown in FIG. 6B, and by reference number 620, the base station may transmit, and the UE may receive, signaling configuring a periodic BFD-RS and/or an aperiodic BFD-RS linked to the periodic BFD-RS. For example, in some aspects, configuration information associated with the periodic BFD-RS may be explicitly signaled to the UE, and the signaling may explicitly indicate a linkage or association between the periodic BFD-RS and one or more reference signal resource identifiers associated with the corresponding aperiodic BFD-RS (e.g., via RRC, MAC-CE, and/or DCI signaling, using a parameter such as a RadioLinkMonitoringRS information element). Alternatively, in some aspects, the aperiodic BFD-RS associated with a periodic BFD-RS may be implicitly determined by the UE based on one or more predefined rules (e.g., rules defined in one or more wireless communication standards).

For example, in some aspects, an aperiodic reference signal may be associated with the periodic BFD-RS based on the aperiodic reference signal and the periodic BFD-RS sharing a QCL source reference signal (e.g., the aperiodic reference signal and the periodic BFD-RS both have the same QCL-TypeD reference signal in corresponding TCI states). Additionally, or alternatively, an aperiodic reference signal may be associated with the periodic BFD-RS based on the aperiodic reference signal and the periodic BFD-RS having resource identifiers that satisfy one or more rules (e.g., the resource identifier for the aperiodic reference signal is a fixed offset from the resource identifier associated with the periodic BFD-RS). Additionally, or alternatively, the aperiodic reference signal may have a resource set identifier or a trigger state identifier that is associated with the periodic BFD-RS (e.g., in cases where the aperiodic reference signal has multiple transmission opportunities that correspond to multiple aperiodic reference signal resources in a resource set triggered by a trigger state).

In some aspects, in cases where the configuration information associated with the periodic BFD-RS is implicitly signaled to the UE, the association with the corresponding aperiodic reference signal may be determined in a similar manner as described above. For example, the base station may explicitly indicate the linkage or association between the implicitly signaled periodic BFD-RS and the corresponding aperiodic BFD-RS, or the aperiodic BFD-RS associated with the implicitly signaled periodic BFD-RS may be determined by the UE based on one or more predefined rules (e.g., based on the aperiodic reference signal and the periodic BFD-RS sharing a QCL source reference signal and/or having resource identifiers that satisfy one or more rules). For example, in some aspects, the periodic BFD-RS may correspond to a QCL source reference signal in a TCI state associated with a CORESET monitored by the UE (e.g., a QCL source reference signal associated with QCL-TypeA, QCL-TypeB, QCL-TypeC, or QCL-TypeD), and the aperiodic reference signal linked to the periodic BFD-RS may be explicitly indicated or implicitly determined, as described above.

As further shown in FIG. 6B, and by reference number 622, the base station may transmit the aperiodic BFD-RS linked to the non-transmitted periodic BFD-RS within a time window after a scheduled occasion in which the periodic BFD-RS is not transmitted (e.g., a missed occasion) due to LBT failure. For example, when the base station is unable to transmit the BFD-RS in a scheduled occasion because an attempted LBT procedure failed prior to the scheduled occasion, the base station may transmit the aperiodic BFD-RS within a time window that has a start time and/or an end time that is indicated to the UE or defined in one or more wireless communication standards. In some aspects, the time window may be associated with each scheduled occasion of the periodic BFD-RS. For example, as shown by reference number 624, the base station may attempt an LBT procedure prior to a scheduled occasion of a periodic BFD-RS, and the base station may refrain from transmitting the periodic BFD-RS in the scheduled occasion due to an LBT failure. Accordingly, as shown by reference number 626, the base station may transmit the aperiodic BFD-RS during a time window with a start time and/or an end time that is based on the missed periodic BFD-RS occasion. For example, in FIG. 6B, the time window has a start time that begins at an end of the missed periodic BFD-RS occasion, and the time window has an end time before a next occasion of the periodic BFD-RS.

In some aspects, as described herein, the aperiodic BFD-RS may be associated with configuration information including one or more parameters to mitigate the non-transmission of the corresponding periodic BFD-RS. For example, in some aspects, the aperiodic BFD-RS may be exempt from the LBT requirement (e.g., the base station can always transmit the aperiodic BFD-RS). Alternatively, in some aspects, the aperiodic BFD-RS may always be subject to the LBT requirement (e.g., to ensure fair coexistence with other transmitters that may be occupying the wireless channel). Alternatively, to increase a probability that the base station will be able to transmit the aperiodic BFD-RS and thereby avoid the UE unnecessarily triggering a BFR procedure, the aperiodic BFD-RS may be exempt from the LBT requirement when one or more conditions are satisfied. For example, the base station may transmit the aperiodic BFD-RS without having to perform a successful LBT procedure and/or after LBT failure if the LBT procedure fails a threshold number of consecutive times for the same aperiodic BFD-RS. Additionally, or alternatively, the base station may transmit the aperiodic BFD-RS without having to perform a successful LBT procedure and/or after LBT failure at the last possible time before a deadline or time window expires for the aperiodic BFD-RS. Additionally, or alternatively, in cases where the aperiodic BFD-RS includes multiple transmission opportunities, the base station may transmit the aperiodic BFD-RS without having to perform a successful LBT procedure and/or after LBT failure in the last transmission opportunity if LBT failed prior to all earlier transmission opportunities.

As further shown in FIG. 6B, and by reference number 628, the UE may estimate a beam quality associated with the missed occasion (e.g., the scheduled occasion in which the periodic BFD-RS was not transmitted) based on the aperiodic BFD-RS and/or the missed periodic BFD-RS. For example, when the UE determines that the periodic BFD-RS was not transmitted in a scheduled occasion, the UE may monitor the wireless channel for the aperiodic BFD-RS within the time window associated with the missed occasion. Accordingly, in cases where the UE receives the aperiodic BFD-RS within the time window associated with the missed occasion of the periodic BFD-RS, the UE may use the received aperiodic BFD-RS to estimate the beam quality associated with the corresponding occasion. Alternatively, the UE may use the best measurement result based on the measurement associated with the received aperiodic BFD-RS and the measurement at the missed occasion of the periodic BFD-RS. For example, the UE may individually evaluate the measurement associated with the received aperiodic BFD-RS and the measurement at the missed occasion of the periodic BFD-RS individually, and the UE may also jointly evaluate the measurements associated with the received aperiodic BFD-RS and the missed occasion of the periodic BFD-RS. In this case, the UE may use the individual or joint measurement result that provides the best estimated beam quality for the corresponding occasion. Alternatively, in cases where the UE fails to detect or otherwise receive the aperiodic BFD-RS within the time window (e.g., where the aperiodic BFD-RS is always subject to the LBT requirement and is not transmitted due to repeated LBT failure), the UE may estimate the beam quality for the missed occasion based on the measurement result at the missed occasion of the periodic BFD-RS.

As shown in FIG. 6C, and by reference number 630, the base station may further mitigate the non-transmission of one or more BFD-RSs due to LBT failure by transmitting, to the UE, signaling to indicate each occasion in which a BFD-RS (e.g., a periodic and/or aperiodic BFD-RS) is not transmitted due to LBT failure. For example, the signaling may generally indicate an identifier associated with the BFD-RS that was not transmitted and may further indicate an index associated with the occasion or period in which the BFD-RS was not transmitted due to LBT failure. Accordingly, as described herein, the UE may determine a measurement result for the missed occasion or period based on the signaling indicating the non-transmitted BFD-RS to avoid unnecessarily triggering a BFR procedure caused by the LBT failure (e.g., as opposed to a BFR procedure triggered by poor channel conditions).

For example, in some aspects, the signaling transmitted by the base station may indicate the identifier associated with the BFD-RS that was not transmitted due to LBT failure, and may further include an explicit, implicit, or mixed explicit and implicit indication of the index in which the BFD-RS was not transmitted. For example, each BFD-RS occasion may have a global index that is based on a position of the BFD-RS occasion within a frame. For example, a first global index may be assigned to a first occasion or period from the start of the frame with a system frame number (SFN) of zero (0), a second global index may be assigned to a second occasion or period from the start of the frame, and so on. Accordingly, when the index is explicitly indicated, the base station may signal the global index of each occasion or period in which the corresponding BFD-RS is not transmitted due to LBT failure. Alternatively, multiple non-transmitted occasions or periods can be signaled to the UE in a bitmap (e.g., where the global index of the occasion or period corresponding to the first or last bit in the bitmap is indicated to the UE, and each bit in the bitmap indicates whether a BFD-RS was transmitted or not transmitted in the corresponding occasion or period).

Alternatively, in the case of an implicit indication, the index associated with the occasion or period in which the BFD-RS was not transmitted due to LBT failure may be indicated according to a time and frequency location of the signaling that indicates the identifier associated with the BFD-RS that was not transmitted. For example, if the base station transmits the signaling to indicate the non-transmitted BFD-RS between occasion n and occasion n+1, the time and frequency location of the signaling may implicitly indicate that the BFD-RS transmission in occasion n was not transmitted. Alternatively, in the case of a mixed explicit and implicit indication, multiple non-transmitted occasions or periods can be signaled to the UE in a bitmap, and the occasion or period corresponding to the first or last bit in the bitmap may be indicated by the time and frequency location of the signaling that indicates the non-transmitted BFD-RS(s). For example, if the base station transmits the signaling to indicate the non-transmitted BFD-RS between occasion n and occasion n+1, the time and frequency location of the signaling may implicitly indicate that occasion n is represented by the first or last bit in the bitmap.

As further shown in FIG. 6C, and by reference number 632, the UE may determine a measurement result for the non-transmitted BFD-RS occasion based on the signaling received from the base station. For example, in some aspects, the UE may ignore or discard a measurement result associated with the non-transmitted BFD-RS occasion. Alternatively, the UE may use a default value as the measurement result associated with the non-transmitted BFD-RS occasion. For example, the default value may be based on a metric that is defined in a wireless communication standard and/or indicated by the base station (e.g., a 10% hypothetical BLER, a 10 decibel (dB) signal-to-interference-plus-noise ratio (SINR), and/or a −70 decibel-milliwatt (dBm) RSRP, among other examples). Furthermore, as shown by reference number 634, the UE may initiate one or more actions to avoid unnecessarily triggering a BFR procedure due to LBT failure based on the signaling indicating the non-transmitted BFD-RS(s). For example, a PHY layer of the UE may inform a MAC layer of the UE to ignore any BFD indicator(s) caused by measurement results at the occasion(s) or period(s) associated with the non-transmitted BFD-RS(s). Additionally, or alternatively, the PHY layer of the UE may inform the MAC layer of the UE to terminate any BFR procedure that may have been triggered by measurement results at the occasion(s) or period(s) associated with the non-transmitted BFD-RS(s). In this way, the UE may avoid unnecessarily triggering a BFR procedure when one or more BFD-RSs are not transmitted due to LBT failure, which may avoid causing unnecessary overhead to establish a new beam and/or avoid interruption to ongoing traffic, among other examples.

As indicated above, FIGS. 6A-6C are provided as examples. Other examples may differ from what is described with regard to FIGS. 6A-6C. For example, although the techniques described herein generally relate to mitigating a non-transmitted BFD-RS due to LBT failure, the same or similar techniques may apply to other periodic signals that are not transmitted due to an LBT failure. For example, the techniques described in further detail above may be applied to mitigate non-transmission of a periodic tracking reference signal (TRS), a phase tracking reference signal (PTRS), a pathloss reference signal (PLRS), and/or a reference signal used for radio link management (RLM) or radio resource management (RRM), among other examples. Furthermore, in some aspects, the techniques described above with reference to FIGS. 6A-6C may be applied to mitigate a non-transmitted BFD-RS to avoid unnecessarily triggering a primary cell (PCell) BFR, a secondary cell (SCell) BFR, a secondary primary cell (SpCell) BFR, a TRP-specific BFR, and/or a partial BFR for a single TRP, among other examples.

Figure 7:
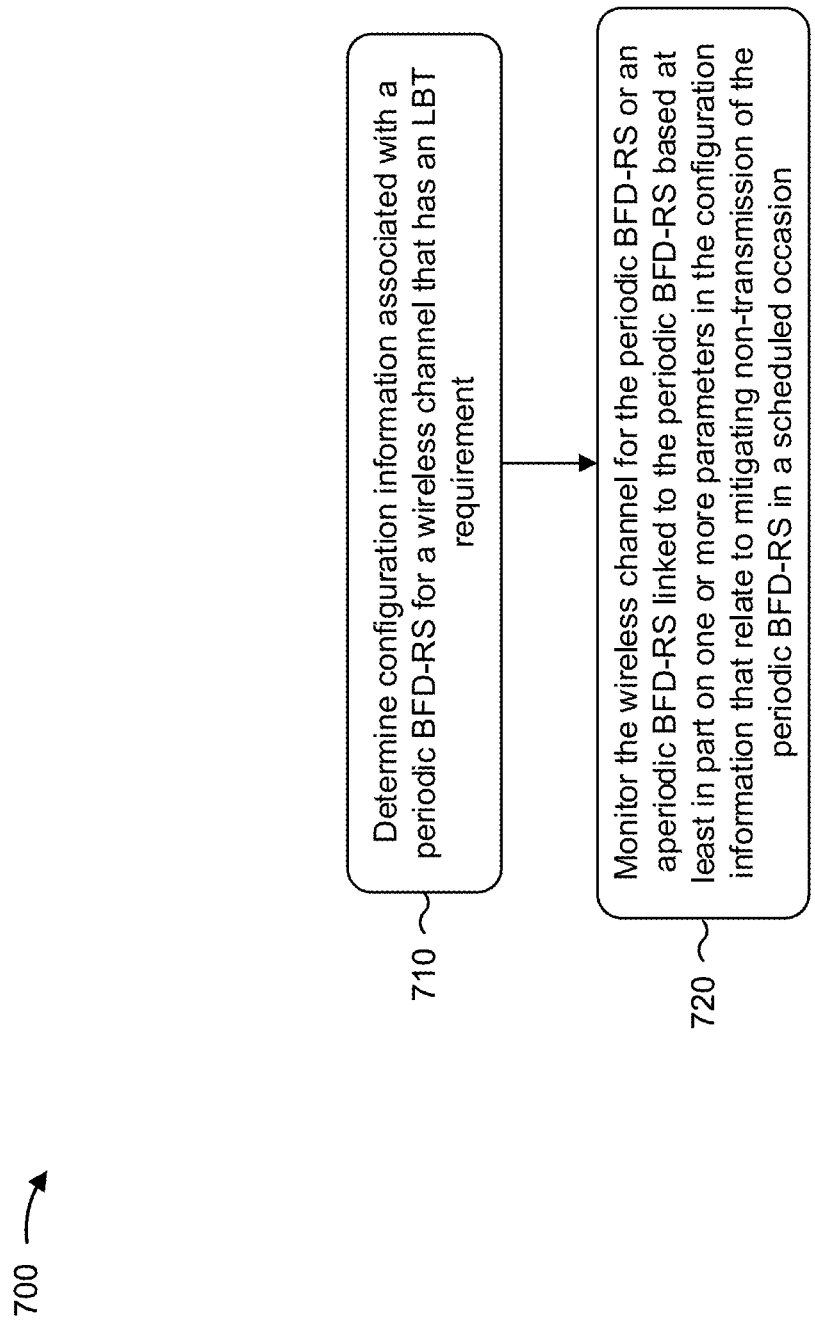
FIGS. 7-8 are diagrams illustrating example processes associated with mitigating a non-transmitted BFD-RS due to LBT failure, in accordance with the present disclosure.

FIG. 7 is a diagram illustrating an example process 700 performed, for example, by a UE, in accordance with the present disclosure. Example process 700 is an example where the UE (e.g., UE 120) performs operations associated with mitigating a non-transmitted BFD-RS due to LBT failure.

As shown in FIG. 7, in some aspects, process 700 may include determining configuration information associated with a periodic BFD-RS for a wireless channel that has an LBT requirement (block 710). For example, the UE (e.g., using determination component 908, depicted in FIG. 9) may determine configuration information associated with a periodic BFD-RS for a wireless channel that has an LBT requirement, as described above.

As further shown in FIG. 7, in some aspects, process 700 may include monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion (block 720). For example, the UE (e.g., using beam failure detection component 910, depicted in FIG. 9) may monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion, as described above.

Process 700 may include additional aspects, such as any single aspect or any combination of aspects described below and/or in connection with one or more other processes described elsewhere herein.

In a first aspect, the one or more parameters indicate that transmission of the periodic BFD-RS is exempt from the LBT requirement.

In a second aspect, alone or in combination with the first aspect, the one or more parameters indicate periodic clusters that each include multiple transmission opportunities for the periodic BFD-RS.

In a third aspect, alone or in combination with one or more of the first and second aspects, process 700 includes estimating, within each periodic cluster, a beam quality based at least in part on a measurement associated with the periodic BFD-RS in one of the multiple transmission opportunities that provides a best estimated quality.

In a fourth aspect, alone or in combination with one or more of the first through third aspects, process 700 includes estimating, within each periodic cluster, a beam quality based at least in part on a joint measurement associated with the periodic BFD-RS across all of the multiple transmission opportunities in the periodic cluster.

In a fifth aspect, alone or in combination with one or more of the first through fourth aspects, process 700 includes receiving, from a base station, signaling to configure one or more measurements to estimate a beam quality associated with the periodic BFD-RS within each periodic cluster.

In a sixth aspect, alone or in combination with one or more of the first through fifth aspects, process 700 includes receiving, from a base station, signaling indicating individual resource identifiers that each correspond to one transmission opportunity and further indicating a periodicity that is common to the multiple transmission opportunities.

In a seventh aspect, alone or in combination with one or more of the first through sixth aspects, process 700 includes receiving, from a base station, signaling indicating a resource set associated with periodic reference signal resources for the multiple transmission opportunities.

In an eighth aspect, alone or in combination with one or more of the first through seventh aspects, process 700 includes receiving, from a base station, signaling indicating a periodic resource identifier and a periodic pattern that is common to the multiple transmission opportunities.

In a ninth aspect, alone or in combination with one or more of the first through eighth aspects, the periodic resource identifier is based at least in part on a QCL source reference signal in a TCI state associated with a CORESET.

In a tenth aspect, alone or in combination with one or more of the first through ninth aspects, process 700 includes determining a priority associated with the periodic BFD-RS based at least in part on a number of the multiple transmission opportunities within each periodic cluster.

In an eleventh aspect, alone or in combination with one or more of the first through tenth aspects, the one or more parameters indicate an association between the periodic BFD-RS and the aperiodic BFD-RS.

In a twelfth aspect, alone or in combination with one or more of the first through eleventh aspects, process 700 includes receiving, from a base station, signaling indicating the association between the periodic BFD-RS and the aperiodic BFD-RS.

In a thirteenth aspect, alone or in combination with one or more of the first through twelfth aspects, process 700 includes determining the association between the periodic BFD-RS and the aperiodic BFD-RS based at least in part on a QCL source reference signal associated with the periodic BFD-RS and a QCL source reference signal associated with the aperiodic BFD-RS.

In a fourteenth aspect, alone or in combination with one or more of the first through thirteenth aspects, process 700 includes determining the association between the periodic BFD-RS and the aperiodic BFD-RS based at least in part on a resource identifier associated with the periodic BFD-RS and a resource identifier associated with the aperiodic BFD-RS.

In a fifteenth aspect, alone or in combination with one or more of the first through fourteenth aspects, process 700 includes monitoring the wireless channel for the aperiodic BFD-RS linked to the periodic BFD-RS during a time window for the aperiodic BFD-RS based at least in part on a failure to detect the periodic BFD-RS in the scheduled occasion.

In a sixteenth aspect, alone or in combination with one or more of the first through fifteenth aspects, process 700 includes detecting a transmission of the aperiodic BFD-RS during the time window associated with the scheduled occasion of the periodic BFD-RS, and estimating a beam quality based at least in part on a measurement associated with the transmission of the aperiodic BFD-RS detected during the time window.

In a seventeenth aspect, alone or in combination with one or more of the first through sixteenth aspects, process 700 includes detecting a transmission of the aperiodic BFD-RS during the time window associated with the scheduled occasion of the periodic BFD-RS, and estimating a beam quality based at least in part on a first measurement associated with the transmission of the aperiodic BFD-RS detected during the time window and a second measurement associated with the scheduled occasion of the periodic BFD-RS.

In an eighteenth aspect, alone or in combination with one or more of the first through seventeenth aspects, process 700 includes determining that the aperiodic BFD-RS is not detected during the time window associated with the scheduled occasion of the periodic BFD-RS, and estimating a beam quality based at least in part on a measurement associated with the scheduled occasion of the periodic BFD-RS.

In a nineteenth aspect, alone or in combination with one or more of the first through eighteenth aspects, the one or more parameters indicate that transmission of the aperiodic BFD-RS is exempt from the LBT requirement.

In a twentieth aspect, alone or in combination with one or more of the first through nineteenth aspects, the one or more parameters indicate that transmission of the aperiodic BFD-RS is always subject to the LBT requirement.

In a twenty-first aspect, alone or in combination with one or more of the first through twentieth aspects, the one or more parameters indicate that transmission of the aperiodic BFD-RS is subject to the LBT requirement when one or more conditions are satisfied.

In a twenty-second aspect, alone or in combination with one or more of the first through twenty-first aspects, process 700 includes receiving, from a base station, signaling to indicate the non-transmission of the periodic BFD-RS in the scheduled occasion, and determining a beam quality measurement based at least in part on the non-transmission of the periodic BFD-RS in the scheduled occasion.

In a twenty-third aspect, alone or in combination with one or more of the first through twenty-second aspects, the signaling includes an identifier associated with the periodic BFD-RS and an index associated with the scheduled occasion in which the periodic BFD-RS was not transmitted.

In a twenty-fourth aspect, alone or in combination with one or more of the first through twenty-third aspects, the index associated with the scheduled occasion in which the periodic BFD-RS was not transmitted is based at least in part on a position of the scheduled occasion within a frame.

In a twenty-fifth aspect, alone or in combination with one or more of the first through twenty-fourth aspects, the index associated with the scheduled occasion in which the periodic BFD-RS was not transmitted is based at least in part on a time and frequency location of the signaling.

In a twenty-sixth aspect, alone or in combination with one or more of the first through twenty-fifth aspects, the signaling includes a bitmap that indicates indexes associated with one or more scheduled occasions in which one or more periodic BFD-RSs were not transmitted, and an occasion that corresponds to a first bit or a last bit in the bitmap is based at least in part on a time and frequency location of the signaling.

In a twenty-seventh aspect, alone or in combination with one or more of the first through twenty-sixth aspects, process 700 includes discarding a measurement result or use a default value as the measurement result for the periodic BFD-RS in the scheduled occasion in which the periodic BFD-RS was not transmitted.

In a twenty-eighth aspect, alone or in combination with one or more of the first through twenty-seventh aspects, process 700 includes ignoring a beam failure detection indicator caused by the non-transmission of the periodic BFD-RS in the scheduled occasion.

In a twenty-ninth aspect, alone or in combination with one or more of the first through twenty-eighth aspects, process 700 includes terminating a beam failure recovery procedure triggered by the non-transmission of the periodic BFD-RS in the scheduled occasion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
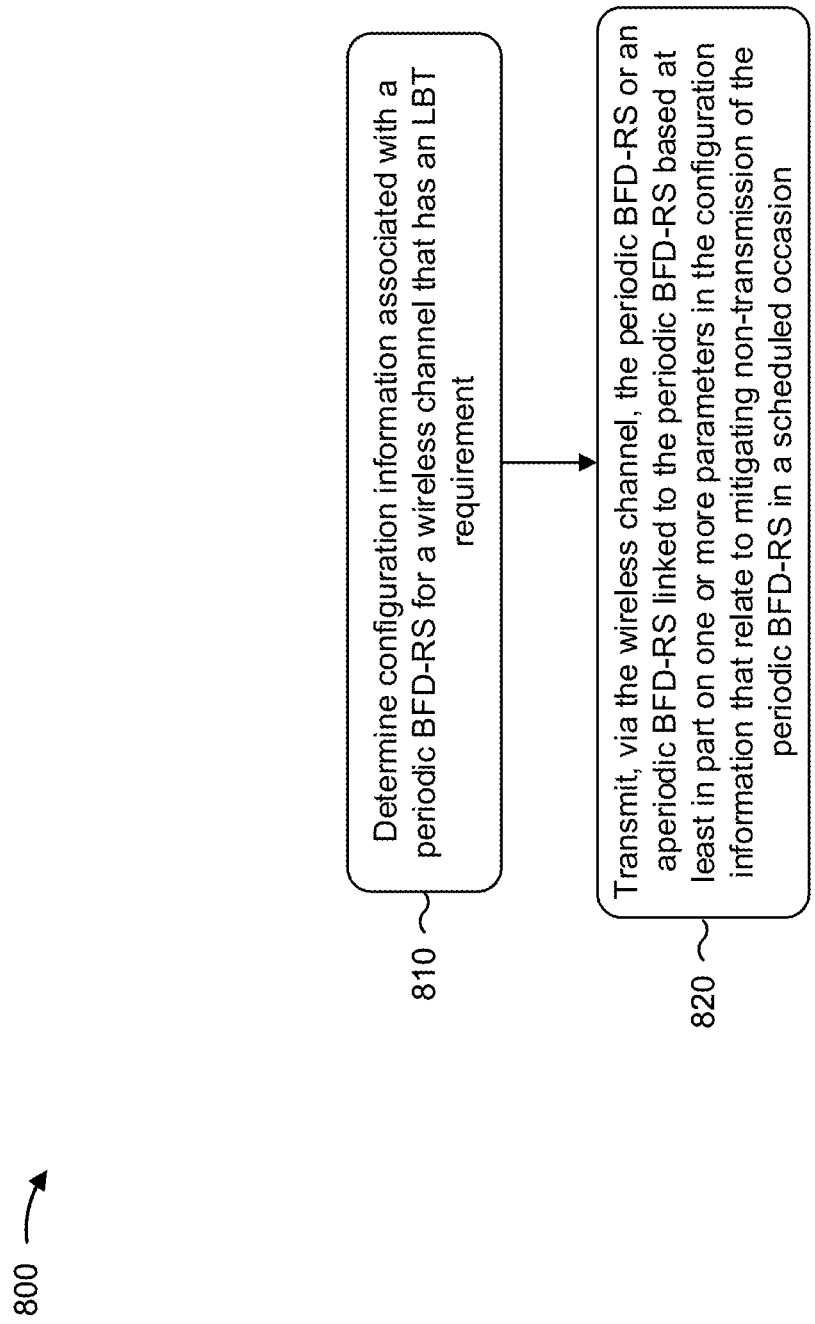

FIG. 8 is a diagram illustrating an example process 800 performed, for example, by a base station, in accordance with the present disclosure. Example process 800 is an example where the base station (e.g., base station 110) performs operations associated with mitigating a non-transmitted BFD-RS due to LBT failure.

As shown in FIG. 8, in some aspects, process 800 may include determining configuration information associated with a periodic BFD-RS for a wireless channel that has an LBT requirement (block 810). For example, the base station (e.g., using determination component 1008, depicted in FIG. 10) may determine configuration information associated with a periodic BFD-RS for a wireless channel that has an LBT requirement, as described above.

As further shown in FIG. 8, in some aspects, process 800 may include transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion (block 820). For example, the base station (e.g., using transmission component 1004, depicted in FIG. 10) may transmit, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion, as described above.

Process 800 may include additional aspects, such as any single aspect or any combination of aspects described below and/or in connection with one or more other processes described elsewhere herein.

In a first aspect, the one or more parameters indicate that transmission of the periodic BFD-RS is exempt from the LBT requirement.

In a second aspect, alone or in combination with the first aspect, the one or more parameters indicate periodic clusters that each include multiple transmission opportunities for the periodic BFD-RS.

In a third aspect, alone or in combination with one or more of the first and second aspects, process 800 includes attempting an LBT procedure prior to each of the multiple transmission opportunities for the periodic BFD-RS, and transmitting, within each periodic cluster, the periodic BFD-RS in an earliest of the multiple transmission opportunities in which the LBT procedure succeeds.

In a fourth aspect, alone or in combination with one or more of the first through third aspects, process 800 includes attempting an LBT procedure prior to each of the multiple transmission opportunities for the periodic BFD-RS, and refraining from transmitting the periodic BFD-RS within a periodic cluster based at least in part on the LBT procedure failing prior to each of the multiple transmission opportunities.

In a fifth aspect, alone or in combination with one or more of the first through fourth aspects, process 800 includes attempting an LBT procedure prior to each of the multiple transmission opportunities for the periodic BFD-RS, and transmitting, within a periodic cluster, the periodic BFD-RS in a last of the multiple transmission opportunities based at least in part on the LBT procedure failing prior to each of the multiple transmission opportunities that occur prior to the last transmission opportunity.

In a sixth aspect, alone or in combination with one or more of the first through fifth aspects, process 800 includes transmitting, to a UE, signaling to configure one or more measurements to estimate a beam quality associated with the periodic BFD-RS within each periodic cluster.

In a seventh aspect, alone or in combination with one or more of the first through sixth aspects, process 800 includes transmitting, to a UE, signaling indicating individual resource identifiers that each correspond to one transmission opportunity and further indicating a periodicity that is common to the multiple transmission opportunities.

In an eighth aspect, alone or in combination with one or more of the first through seventh aspects, process 800 includes transmitting, to a UE, signaling indicating a resource set associated with periodic reference signal resources for the multiple transmission opportunities.

In a ninth aspect, alone or in combination with one or more of the first through eighth aspects, process 800 includes transmitting, to a UE, signaling indicating a periodic resource identifier and a periodic pattern that is common to the multiple transmission opportunities.

In a tenth aspect, alone or in combination with one or more of the first through ninth aspects, the periodic resource identifier is based at least in part on a QCL source reference signal in a TCI state associated with a CORESET.

In an eleventh aspect, alone or in combination with one or more of the first through tenth aspects, the one or more parameters indicate an association between the periodic BFD-RS and the aperiodic BFD-RS.

In a twelfth aspect, alone or in combination with one or more of the first through eleventh aspects, process 800 includes transmitting, to a UE, signaling indicating the association between the periodic BFD-RS and the aperiodic BFD-RS.

In a thirteenth aspect, alone or in combination with one or more of the first through twelfth aspects, the association between the periodic BFD-RS and the aperiodic BFD-RS is based at least in part on a QCL source reference signal associated with the periodic BFD-RS and a QCL source reference signal associated with the aperiodic BFD-RS.

In a fourteenth aspect, alone or in combination with one or more of the first through thirteenth aspects, the association between the periodic BFD-RS and the aperiodic BFD-RS is based at least in part on a resource identifier associated with the periodic BFD-RS and a resource identifier associated with the aperiodic BFD-RS.

In a fifteenth aspect, alone or in combination with one or more of the first through fourteenth aspects, process 800 includes transmitting the aperiodic BFD-RS linked to the periodic BFD-RS via the wireless channel during a time window for the aperiodic BFD-RS based at least in part on the non-transmission of the periodic BFD-RS in the scheduled occasion.

In a sixteenth aspect, alone or in combination with one or more of the first through fifteenth aspects, the time window has one or more of a start time or an end time associated with the scheduled occasion in which the non-transmission of the periodic BFD-RS occurred.

In a seventeenth aspect, alone or in combination with one or more of the first through sixteenth aspects, the one or more parameters indicate that transmission of the aperiodic BFD-RS is exempt from the LBT requirement.

In an eighteenth aspect, alone or in combination with one or more of the first through seventeenth aspects, the one or more parameters indicate that transmission of the aperiodic BFD-RS is always subject to the LBT requirement.

In a nineteenth aspect, alone or in combination with one or more of the first through eighteenth aspects, the one or more parameters indicate that transmission of the aperiodic BFD-RS is subject to the LBT requirement when one or more conditions are satisfied.

In a twentieth aspect, alone or in combination with one or more of the first through nineteenth aspects, process 800 includes transmitting, to a UE, signaling to indicate the non-transmission of the periodic BFD-RS in the scheduled occasion, wherein a beam quality measurement determined by the UE is based at least in part on the non-transmission of the periodic BFD-RS in the scheduled occasion.

In a twenty-first aspect, alone or in combination with one or more of the first through twentieth aspects, the signaling includes an identifier associated with the periodic BFD-RS and an index associated with the scheduled occasion in which the periodic BFD-RS was not transmitted.

In a twenty-second aspect, alone or in combination with one or more of the first through twenty-first aspects, the index associated with the scheduled occasion in which the periodic BFD-RS was not transmitted is based at least in part on a position of the scheduled occasion within a frame.

In a twenty-third aspect, alone or in combination with one or more of the first through twenty-second aspects, the index associated with the scheduled occasion in which the periodic BFD-RS was not transmitted is based at least in part on a time and frequency location of the signaling.

In a twenty-fourth aspect, alone or in combination with one or more of the first through twenty-third aspects, the signaling includes a bitmap that indicates indexes associated with one or more scheduled occasions in which one or more periodic BFD-RSs were not transmitted, and an occasion that corresponds to a first bit or a last bit in the bitmap is based at least in part on a time and frequency location of the signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
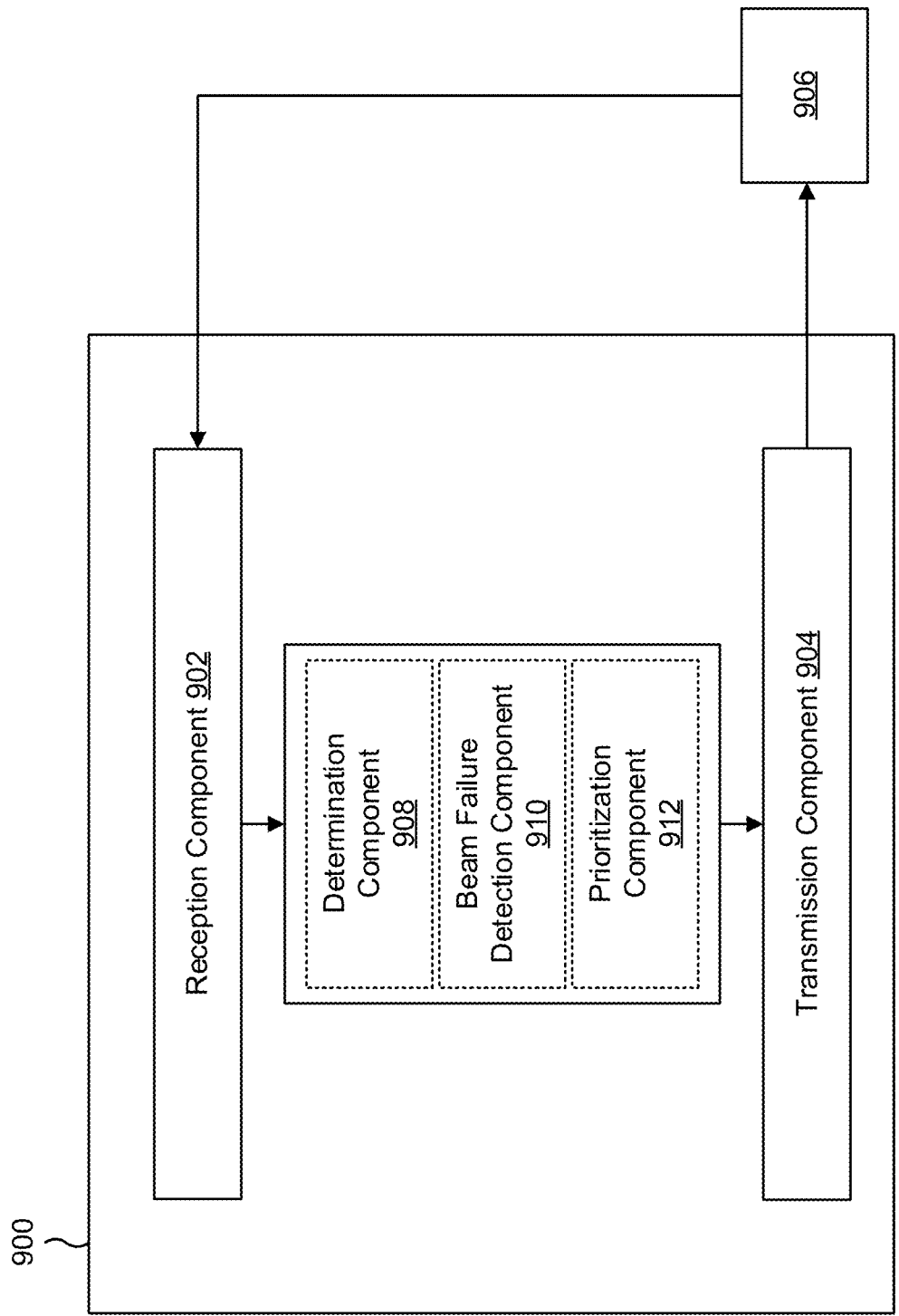
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, a beam failure detection component 910, or a prioritization component 912, among other examples.

In some aspects, the apparatus 900 may be configured to perform one or more operations described herein in connection with FIGS. 6A-6C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine configuration information associated with a periodic BFD-RS for a wireless channel that has an LBT requirement. The beam failure detection component 910 may monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

The beam failure detection component 910 may estimate, within each periodic cluster, a beam quality based at least in part on a measurement associated with the periodic BFD-RS in one of the multiple transmission opportunities that provides a best estimated quality.

The beam failure detection component 910 may estimate, within each periodic cluster, a beam quality based at least in part on a joint measurement associated with the periodic BFD-RS across all of the multiple transmission opportunities in the periodic cluster.

The reception component 902 may receive, from a base station, signaling to configure one or more measurements to estimate a beam quality associated with the periodic BFD-RS within each periodic cluster.

The reception component 902 may receive, from a base station, signaling indicating individual resource identifiers that each correspond to one transmission opportunity and further indicating a periodicity that is common to the multiple transmission opportunities.

The reception component 902 may receive, from a base station, signaling indicating a resource set associated with periodic reference signal resources for the multiple transmission opportunities.

The reception component 902 may receive, from a base station, signaling indicating a periodic resource identifier and a periodic pattern that is common to the multiple transmission opportunities.

The prioritization component 912 may determine a priority associated with the periodic BFD-RS based at least in part on a number of the multiple transmission opportunities within each periodic cluster.

The reception component 902 may receive, from a base station, signaling indicating the association between the periodic BFD-RS and the aperiodic BFD-RS.

The determination component 908 may determine the association between the periodic BFD-RS and the aperiodic BFD-RS based at least in part on a QCL source reference signal associated with the periodic BFD-RS and a QCL source reference signal associated with the aperiodic BFD-RS.

The determination component 908 may determine the association between the periodic BFD-RS and the aperiodic BFD-RS based at least in part on a resource identifier associated with the periodic BFD-RS and a resource identifier associated with the aperiodic BFD-RS.

The beam failure detection component 910 may monitor the wireless channel for the aperiodic BFD-RS linked to the periodic BFD-RS during a time window for the aperiodic BFD-RS based at least in part on a failure to detect the periodic BFD-RS in the scheduled occasion.

The beam failure detection component 910 may detect a transmission of the aperiodic BFD-RS during the time window associated with the scheduled occasion of the periodic BFD-RS.

The beam failure detection component 910 may estimate a beam quality based at least in part on a measurement associated with the transmission of the aperiodic BFD-RS detected during the time window.

The beam failure detection component 910 may detect a transmission of the aperiodic BFD-RS during the time window associated with the scheduled occasion of the periodic BFD-RS.

The beam failure detection component 910 may estimate a beam quality based at least in part on a first measurement associated with the transmission of the aperiodic BFD-RS detected during the time window and a second measurement associated with the scheduled occasion of the periodic BFD-RS.

The determination component 908 may determine that the aperiodic BFD-RS is not detected during the time window associated with the scheduled occasion of the periodic BFD-RS.

The beam failure detection component 910 may estimate a beam quality based at least in part on a measurement associated with the scheduled occasion of the periodic BFD-RS.

The reception component 902 may receive, from a base station, signaling to indicate the non-transmission of the periodic BFD-RS in the scheduled occasion.

The beam failure detection component 910 may determine a beam quality measurement based at least in part on the non-transmission of the periodic BFD-RS in the scheduled occasion.

The beam failure detection component 910 may discard a measurement result or use a default value as the measurement result for the periodic BFD-RS in the scheduled occasion in which the periodic BFD-RS was not transmitted.

The beam failure detection component 910 may ignore a beam failure detection indicator caused by the non-transmission of the periodic BFD-RS in the scheduled occasion.

The beam failure detection component 910 may terminate a beam failure recovery procedure triggered by the non-transmission of the periodic BFD-RS in the scheduled occasion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
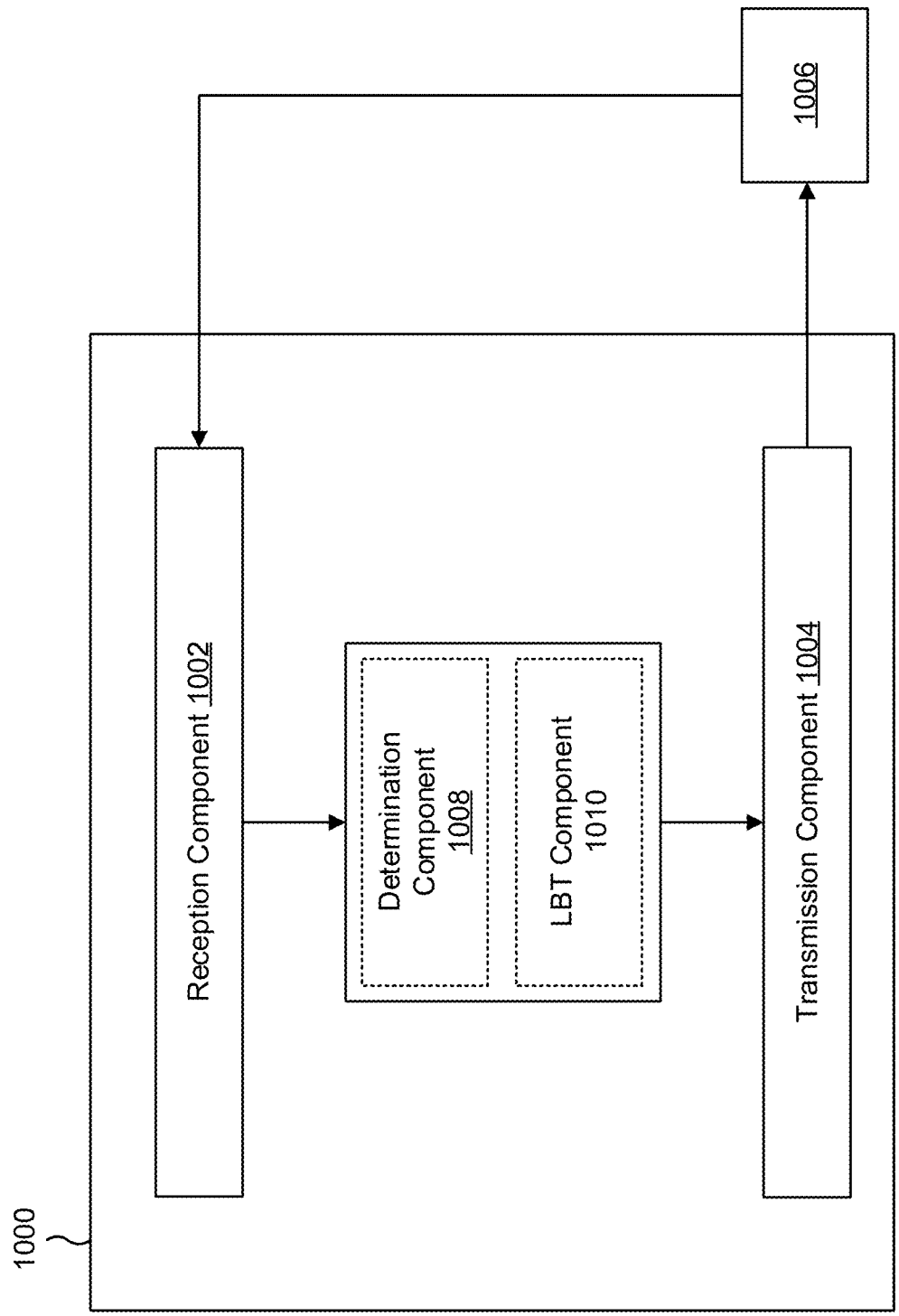

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or an LBT component 1010, among other examples.

In some aspects, the apparatus 1000 may be configured to perform one or more operations described herein in connection with FIGS. 6A-6C. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The determination component 1008 may determine configuration information associated with a periodic BFD-RS for a wireless channel that has an LBT requirement. The transmission component 1004 may transmit, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

The LBT component 1010 may attempt an LBT procedure prior to each of the multiple transmission opportunities for the periodic BFD-RS.

The transmission component 1004 may transmit, within each periodic cluster, the periodic BFD-RS in an earliest of the multiple transmission opportunities in which the LBT procedure succeeds.

The LBT component 1010 may attempt an LBT procedure prior to each of the multiple transmission opportunities for the periodic BFD-RS.

The transmission component 1004 may refrain from transmitting the periodic BFD-RS within a periodic cluster based at least in part on the LBT procedure failing prior to each of the multiple transmission opportunities.

The LBT component 1010 may attempt an LBT procedure prior to each of the multiple transmission opportunities for the periodic BFD-RS.

The transmission component 1004 may transmit, within a periodic cluster, the periodic BFD-RS in a last of the multiple transmission opportunities based at least in part on the LBT procedure failing prior to each of the multiple transmission opportunities that occur prior to the last transmission opportunity.

The transmission component 1004 may transmit, to a UE, signaling to configure one or more measurements to estimate a beam quality associated with the periodic BFD-RS within each periodic cluster.

The transmission component 1004 may transmit, to a UE, signaling indicating individual resource identifiers that each correspond to one transmission opportunity and further indicating a periodicity that is common to the multiple transmission opportunities.

The transmission component 1004 may transmit, to a UE, signaling indicating a resource set associated with periodic reference signal resources for the multiple transmission opportunities.

The transmission component 1004 may transmit, to a UE, signaling indicating a periodic resource identifier and a periodic pattern that is common to the multiple transmission opportunities.

The transmission component 1004 may transmit, to a UE, signaling indicating the association between the periodic BFD-RS and the aperiodic BFD-RS.

The transmission component 1004 may transmit the aperiodic BFD-RS linked to the periodic BFD-RS via the wireless channel during a time window for the aperiodic BFD-RS based at least in part on the non-transmission of the periodic BFD-RS in the scheduled occasion.

The transmission component 1004 may transmit, to a UE, signaling to indicate the non-transmission of the periodic BFD-RS in the scheduled occasion, wherein a beam quality measurement determined by the UE is based at least in part on the non-transmission of the periodic BFD-RS in the scheduled occasion.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: determining configuration information associated with a periodic BFD-RS for a wireless channel that has an LBT requirement; and monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion.

Aspect 2: The method of Aspect 1, wherein the one or more parameters indicate that transmission of the periodic BFD-RS is exempt from the LBT requirement.

Aspect 3: The method of Aspect 1, wherein the one or more parameters indicate periodic clusters that each include multiple transmission opportunities for the periodic BFD-RS.

Aspect 4: The method of Aspect 3, further comprising: estimating, within each periodic cluster, a beam quality based at least in part on a measurement associated with the periodic BFD-RS in one of the multiple transmission opportunities that provides a best estimated quality.

Aspect 5: The method of Aspect 3, further comprising: estimating, within each periodic cluster, a beam quality based at least in part on a joint measurement associated with the periodic BFD-RS across all of the multiple transmission opportunities in the periodic cluster.

Aspect 6: The method of any of Aspects 3-5, further comprising: receiving, from a base station, signaling to configure one or more measurements to estimate the beam quality associated with the periodic BFD-RS within each periodic cluster.

Aspect 7: The method of any of Aspects 3-6, further comprising: receiving, from the base station, signaling indicating individual resource identifiers that each correspond to one transmission opportunity and further indicating a periodicity that is common to the multiple transmission opportunities.

Aspect 8: The method of any of Aspects 3-6, further comprising: receiving, from the base station, signaling indicating a resource set associated with periodic reference signal resources for the multiple transmission opportunities.

Aspect 9: The method of any of Aspects 3-6, further comprising: receiving, from the base station, signaling indicating a periodic resource identifier and a periodic pattern that is common to the multiple transmission opportunities.

Aspect 10: The method of Aspect 9, wherein the periodic resource identifier is based at least in part on a QCL source reference signal in a TCI state associated with a CORESET.

Aspect 11: The method of any of Aspects 3-10, further comprising: determining a priority associated with the periodic BFD-RS based at least in part on a number of the multiple transmission opportunities within each periodic cluster.

Aspect 12: The method of Aspect 1, wherein the one or more parameters indicate an association between the periodic BFD-RS and the aperiodic BFD-RS.

Aspect 13: The method of Aspect 12, further comprising: receiving, from a base station, signaling indicating the association between the periodic BFD-RS and the aperiodic BFD-RS.

Aspect 14: The method of Aspect 12, further comprising: determining the association between the periodic BFD-RS and the aperiodic BFD-RS based at least in part on a QCL source reference signal associated with the periodic BFD-RS and a QCL source reference signal associated with the aperiodic BFD-RS.

Aspect 15: The method of Aspect 12, further comprising: determining the association between the periodic BFD-RS and the aperiodic BFD-RS based at least in part on a resource identifier associated with the periodic BFD-RS and a resource identifier associated with the aperiodic BFD-RS.

Aspect 16: The method of any of Aspects 12-15, further comprising: monitoring the wireless channel for the aperiodic BFD-RS linked to the periodic BFD-RS during a time window for the aperiodic BFD-RS based at least in part on a failure to detect the periodic BFD-RS in the scheduled occasion.

Aspect 17: The method of Aspect 16, further comprising: detecting a transmission of the aperiodic BFD-RS during the time window associated with the scheduled occasion of the periodic BFD-RS; and estimating a beam quality based at least in part on a measurement associated with the transmission of the aperiodic BFD-RS detected during the time window.

Aspect 18: The method of any of Aspects 16-17, further comprising: detecting a transmission of the aperiodic BFD-RS during the time window associated with the scheduled occasion of the periodic BFD-RS; and estimating a beam quality based at least in part on a first measurement associated with the transmission of the aperiodic BFD-RS detected during the time window and a second measurement associated with the scheduled occasion of the periodic BFD-RS.

Aspect 19: The method of Aspect 16, further comprising: determining that the aperiodic BFD-RS is not detected during the time window associated with the scheduled occasion of the periodic BFD-RS; and estimating a beam quality based at least in part on a measurement associated with the scheduled occasion of the periodic BFD-RS.

Aspect 20: The method of any of Aspects 1-19, wherein the one or more parameters indicate that transmission of the aperiodic BFD-RS is exempt from the LBT requirement.

Aspect 21: The method of any of Aspects 1-19, wherein the one or more parameters indicate that transmission of the aperiodic BFD-RS is always subject to the LBT requirement.

Aspect 22: The method of any of Aspects 1-19, wherein the one or more parameters indicate that transmission of the aperiodic BFD-RS is subject to the LBT requirement when one or more conditions are satisfied.

Aspect 23: The method of any of Aspects 1-22, further comprising: receiving, from a base station, signaling to indicate the non-transmission of the periodic BFD-RS in the scheduled occasion; and determining a beam quality measurement based at least in part on the non-transmission of the periodic BFD-RS in the scheduled occasion.

Aspect 24: The method of Aspect 23, wherein the signaling includes an identifier associated with the periodic BFD-RS and an index associated with the scheduled occasion in which the periodic BFD-RS was not transmitted.

Aspect 25: The method of Aspect 24, wherein the index associated with the scheduled occasion in which the periodic BFD-RS was not transmitted is based at least in part on a position of the scheduled occasion within a frame.

Aspect 26: The method of Aspect 24, wherein the index associated with the scheduled occasion in which the periodic BFD-RS was not transmitted is based at least in part on a time and frequency location of the signaling.

Aspect 27: The method of any of Aspects 24-26, wherein the signaling includes a bitmap that indicates indexes associated with one or more scheduled occasions in which one or more periodic BFD-RSs were not transmitted, and wherein an occasion that corresponds to a first bit or a last bit in the bitmap is based at least in part on a time and frequency location of the signaling.

Aspect 28: The method of any of Aspects 23-27, further comprising: discarding a measurement result or use a default value as the measurement result for the periodic BFD-RS in the scheduled occasion in which the periodic BFD-RS was not transmitted.

Aspect 29: The method of any of Aspects 23-28, further comprising: ignoring a beam failure detection indicator caused by the non-transmission of the periodic BFD-RS in the scheduled occasion.

Aspect 30: The method of any of Aspects 23-29, further comprising: terminating a beam failure recovery procedure triggered by the non-transmission of the periodic BFD-RS in the scheduled occasion.

Aspect 31: A method of wireless communication performed by a base station, comprising: determining configuration information associated with a periodic BFD-RS for a wireless channel that has an LBT requirement; and transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion.

Aspect 32: The method of Aspect 31, wherein the one or more parameters indicate that transmission of the periodic BFD-RS is exempt from the LBT requirement.

Aspect 33: The method of Aspect 31, wherein the one or more parameters indicate periodic clusters that each include multiple transmission opportunities for the periodic BFD-RS.

Aspect 34: The method of Aspect 33, further comprising: attempting an LBT procedure prior to each of the multiple transmission opportunities for the periodic BFD-RS; and transmitting, within each periodic cluster, the periodic BFD-RS in an earliest of the multiple transmission opportunities in which the LBT procedure succeeds.

Aspect 35: The method of Aspect 33, further comprising: attempting an LBT procedure prior to each of the multiple transmission opportunities for the periodic BFD-RS; and refraining from transmitting the periodic BFD-RS within a periodic cluster based at least in part on the LBT procedure failing prior to each of the multiple transmission opportunities.

Aspect 36: The method of Aspect 33, further comprising: attempting an LBT procedure prior to each of the multiple transmission opportunities for the periodic BFD-RS; and transmitting, within a periodic cluster, the periodic BFD-RS in a last of the multiple transmission opportunities based at least in part on the LBT procedure failing prior to each of the multiple transmission opportunities that occur prior to the last transmission opportunity.

Aspect 37: The method of any of Aspects 33-36, further comprising: transmitting, to a UE, signaling to configure one or more measurements to estimate a beam quality associated with the periodic BFD-RS within each periodic cluster.

Aspect 38: The method of any of Aspects 33-37, further comprising: transmitting, to the UE, signaling indicating individual resource identifiers that each correspond to one transmission opportunity and further indicating a periodicity that is common to the multiple transmission opportunities.

Aspect 39: The method of any of Aspects 33-37, further comprising: transmitting, to the UE, signaling indicating a resource set associated with periodic reference signal resources for the multiple transmission opportunities.

Aspect 40: The method of any of Aspects 33-37, further comprising: transmitting, to the UE, signaling indicating a periodic resource identifier and a periodic pattern that is common to the multiple transmission opportunities.

Aspect 41: The method of Aspect 40, wherein the periodic resource identifier is based at least in part on a QCL source reference signal in a TCI state associated with a CORESET.

Aspect 42: The method of any of Aspects 31-41, wherein the one or more parameters indicate an association between the periodic BFD-RS and the aperiodic BFD-RS.

Aspect 43: The method of Aspect 42, further comprising: transmitting, to the UE, signaling indicating the association between the periodic BFD-RS and the aperiodic BFD-RS.

Aspect 44: The method of Aspect 42, wherein the association between the periodic BFD-RS and the aperiodic BFD-RS is based at least in part on a QCL source reference signal associated with the periodic BFD-RS and a QCL source reference signal associated with the aperiodic BFD-RS.

Aspect 45: The method of Aspect 42, wherein the association between the periodic BFD-RS and the aperiodic BFD-RS is based at least in part on a resource identifier associated with the periodic BFD-RS and a resource identifier associated with the aperiodic BFD-RS.

Aspect 46: The method of any of Aspects 42-45, further comprising: transmitting the aperiodic BFD-RS linked to the periodic BFD-RS via the wireless channel during a time window for the aperiodic BFD-RS based at least in part on the non-transmission of the periodic BFD-RS in the scheduled occasion.

Aspect 47: The method of Aspect 46, wherein the time window has one or more of a start time or an end time associated with the scheduled occasion in which the non-transmission of the periodic BFD-RS occurred.

Aspect 48: The method of any of Aspects 31-47, wherein the one or more parameters indicate that transmission of the aperiodic BFD-RS is exempt from the LBT requirement.

Aspect 49: The method of any of Aspects 31-47, wherein the one or more parameters indicate that transmission of the aperiodic BFD-RS is always subject to the LBT requirement.

Aspect 50: The method of any of Aspects 31-47, wherein the one or more parameters indicate that transmission of the aperiodic BFD-RS is subject to the LBT requirement when one or more conditions are satisfied.

Aspect 51: The method of any of Aspects 31-50, further comprising: transmitting, to a UE, signaling to indicate the non-transmission of the periodic BFD-RS in the scheduled occasion, wherein a beam quality measurement determined by the UE is based at least in part on the non-transmission of the periodic BFD-RS in the scheduled occasion.

Aspect 52: The method of Aspect 51, wherein the signaling includes an identifier associated with the periodic BFD-RS and an index associated with the scheduled occasion in which the periodic BFD-RS was not transmitted.

Aspect 53: The method of Aspect 52, wherein the index associated with the scheduled occasion in which the periodic BFD-RS was not transmitted is based at least in part on a position of the scheduled occasion within a frame.

Aspect 54: The method of Aspect 52, wherein the index associated with the scheduled occasion in which the periodic BFD-RS was not transmitted is based at least in part on a time and frequency location of the signaling.

Aspect 55: The method of any of Aspects 52-54, wherein the signaling includes a bitmap that indicates indexes associated with one or more scheduled occasions in which one or more periodic BFD-RSs were not transmitted, and wherein an occasion that corresponds to a first bit or a last bit in the bitmap is based at least in part on a time and frequency location of the signaling.

Aspect 56: An apparatus for wireless communication at a device, comprising a processor; memory coupled with the processor; and instructions stored in the memory and executable by the processor to cause the apparatus to perform the method of one or more Aspects of Aspects 1-30.

Aspect 57: A device for wireless communication, comprising a memory and one or more processors, coupled to the memory, configured to perform the method of one or more Aspects of Aspects 1-30.

Aspect 58: An apparatus for wireless communication, comprising at least one means for performing the method of one or more Aspects of Aspects 1-30.

Aspect 59: A non-transitory computer-readable medium storing code for wireless communication, the code comprising instructions executable by a processor to perform the method of one or more Aspects of Aspects 1-30.

Aspect 60: A non-transitory computer-readable medium storing a set of instructions for wireless communication, the set of instructions comprising one or more instructions that, when executed by one or more processors of a device, cause the device to perform the method of one or more Aspects of Aspects 1-30.

Aspect 56: An apparatus for wireless communication at a device, comprising a processor; memory coupled with the processor; and instructions stored in the memory and executable by the processor to cause the apparatus to perform the method of one or more Aspects of Aspects 31-55.

Aspect 57: A device for wireless communication, comprising a memory and one or more processors, coupled to the memory, configured to perform the method of one or more Aspects of Aspects 31-55.

Aspect 58: An apparatus for wireless communication, comprising at least one means for performing the method of one or more Aspects of Aspects 31-55.

Aspect 59: A non-transitory computer-readable medium storing code for wireless communication, the code comprising instructions executable by a processor to perform the method of one or more Aspects of Aspects 31-55.

Aspect 60: A non-transitory computer-readable medium storing a set of instructions for wireless communication, the set of instructions comprising one or more instructions that, when executed by one or more processors of a device, cause the device to perform the method of one or more Aspects of Aspects 31-55.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
determine configuration information associated with a periodic beam failure detection reference signal (BFD-RS) for a wireless channel that has a listen-before-talk (LBT) requirement; and
monitor the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion, wherein the one or more parameters indicate an association between the periodic BFD-RS and the aperiodic BFD-RS, wherein the association between the periodic BFD-RS and the aperiodic BFD-RS is based at least in part on a quasi co-location (QCL) source reference signal associated with the periodic BFD-RS and a QCL source reference signal associated with the aperiodic BFD-RS.

2. The UE of claim 1, wherein the one or more parameters indicate that transmission of the periodic BFD-RS is exempt from the LBT requirement.

3. The UE of claim 1, wherein the one or more parameters indicate periodic clusters that each include multiple transmission opportunities for the periodic BFD-RS.

4. The UE of claim 1, wherein the one or more processors are further configured to:
receive, from a network node, signaling indicating the association between the periodic BFD-RS and the aperiodic BFD-RS.

5. The UE of claim 1, wherein the one or more processors are further configured to:
determine the association between the periodic BFD-RS and the aperiodic BFD-RS based at least in part on the QCL source reference signal associated with the periodic BFD-RS and the QCL source reference signal associated with the aperiodic BFD-RS.

6. The UE of claim 1, wherein the one or more processors are further configured to:
monitor the wireless channel for the aperiodic BFD-RS linked to the periodic BFD-RS during a time window for the aperiodic BFD-RS based at least in part on a failure to detect the periodic BFD-RS in the scheduled occasion.

7. The UE of claim 6, wherein the one or more processors are further configured to:
detect a transmission of the aperiodic BFD-RS during the time window associated with the scheduled occasion of the periodic BFD-RS; and
estimate a beam quality based at least in part on a measurement associated with the transmission of the aperiodic BFD-RS detected during the time window.

8. The UE of claim 6, wherein the one or more processors are further configured to:
detect a transmission of the aperiodic BFD-RS during the time window associated with the scheduled occasion of the periodic BFD-RS; and
estimate a beam quality based at least in part on a first measurement associated with the transmission of the aperiodic BFD-RS detected during the time window and a second measurement associated with the scheduled occasion of the periodic BFD-RS.

9. The UE of claim 6, wherein the one or more processors are further configured to:
determine that the aperiodic BFD-RS is not detected during the time window associated with the scheduled occasion of the periodic BFD-RS; and estimate a beam quality based at least in part on a measurement associated with the scheduled occasion of the periodic BFD-RS.

10. The UE of claim 1, wherein the one or more parameters indicate that transmission of the aperiodic BFD-RS is exempt from the LBT requirement.

11. The UE of claim 1, wherein the one or more parameters indicate that transmission of the aperiodic BFD-RS is always subject to the LBT requirement.

12. The UE of claim 1, wherein the one or more parameters indicate that transmission of the aperiodic BFD-RS is subject to the LBT requirement when one or more conditions are satisfied.

13. The UE of claim 1, wherein the one or more processors are further configured to:
receive, from a network node, signaling to indicate the non-transmission of the periodic BFD-RS in the scheduled occasion; and
determine a beam quality measurement based at least in part on the non-transmission of the periodic BFD-RS in the scheduled occasion.

14. A network node for wireless communication, comprising:
one or more memories; and
one or more processors, coupled to the one or more memories, configured to:
determine configuration information associated with a periodic beam failure detection reference signal (BFD-RS) for a wireless channel that has a listen-before-talk (LBT) requirement; and
transmit, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion, wherein the one or more parameters indicate an association between the periodic BFD-RS and the aperiodic BFD-RS, wherein the association between the periodic BFD-RS and the aperiodic BFD-RS is based at least in part on a quasi co-location (QCL) source reference signal associated with the periodic BFD-RS and a QCL source reference signal associated with the aperiodic BFD-RS.

15. The network node of claim 14, wherein the one or more parameters indicate that transmission of the periodic BFD-RS is exempt from the LBT requirement.

16. The network node of claim 14, wherein the one or more parameters indicate periodic clusters that each include multiple transmission opportunities for the periodic BFD-RS.

17. The network node of claim 14, wherein the one or more processors are further configured to:
transmit, to a user equipment, signaling indicating the association between the periodic BFD-RS and the aperiodic BFD-RS.

18. The network node of claim 14, wherein the one or more processors are further configured to:
transmit the aperiodic BFD-RS linked to the periodic BFD-RS via the wireless channel during a time window for the aperiodic BFD-RS based at least in part on the non-transmission of the periodic BFD-RS in the scheduled occasion.

19. The network node of claim 18, wherein the time window has one or more of a start time or an end time associated with the scheduled occasion in which the non-transmission of the periodic BFD-RS occurred.

20. The network node of claim 14, wherein the one or more parameters indicate that transmission of the aperiodic BFD-RS is exempt from the LBT requirement.

21. The network node of claim 14, wherein the one or more parameters indicate that transmission of the aperiodic BFD-RS is always subject to the LBT requirement.

22. The network node of claim 14, wherein the one or more parameters indicate that transmission of the aperiodic BFD-RS is subject to the LBT requirement when one or more conditions are satisfied.

23. The network node of claim 14, wherein the one or more processors are further configured to:
transmit, to a user equipment (UE), signaling to indicate the non-transmission of the periodic BFD-RS in the scheduled occasion, wherein a beam quality measurement determined by the UE is based at least in part on the non-transmission of the periodic BFD-RS in the scheduled occasion.

24. A method of wireless communication performed by a user equipment (UE), comprising:
determining configuration information associated with a periodic beam failure detection reference signal (BFD-RS) for a wireless channel that has a listen-before-talk (LBT) requirement; and
monitoring the wireless channel for the periodic BFD-RS or an aperiodic BFD-RS linked to the periodic BFD-RS based at least in part on one or more parameters in the configuration information that relate to mitigating non-transmission of the periodic BFD-RS in a scheduled occasion, wherein the one or more parameters indicate an association between the periodic BFD-RS and the aperiodic BFD-RS, wherein the association between the periodic BFD-RS and the aperiodic BFD-RS is based at least in part on a quasi co-location (QCL) source reference signal associated with the periodic BFD-RS and a QCL source reference signal associated with the aperiodic BFD-RS.

25. A method of wireless communication performed by a network node, comprising:
determining configuration information associated with a periodic beam failure detection reference signal (BFD-RS) for a wireless channel that has a listen-before-talk (LBT) requirement; and
transmitting, via the wireless channel, the periodic BFD-RS or an aperiodic BFD-RS linked to the periodic BFD-RS based at least in part on one or more parameters in the configuration information that relate to mitigating non-transmission of the periodic BFD-RS in a scheduled occasion, wherein the one or more parameters indicate an association between the periodic BFD-RS and the aperiodic BFD-RS, wherein the association between the periodic BFD-RS and the aperiodic BFD-RS based at least in part on a quasi co-location (QCL) source reference signal associated with the periodic BFD-RS and a QCL source reference signal associated with the aperiodic BFD-RS.

26. The method of claim 24, wherein the one or more parameters indicate that transmission of the aperiodic BFD-RS is exempt from the LBT requirement.

27. The method of claim 24, wherein the one or more parameters indicate that transmission of the aperiodic BFD-RS is always subject to the LBT requirement.

28. The method of claim 24, wherein the one or more parameters indicate that transmission of the aperiodic BFD-RS is subject to the LBT requirement when one or more conditions are satisfied.

29. The method of claim 25, wherein the one or more parameters indicate that transmission of the aperiodic BFD-RS is exempt from the LBT requirement.

30. The method of claim 25, wherein the one or more parameters indicate that transmission of the aperiodic BFD-RS is always subject to the LBT requirement.

* * * * *